US006818261B2

(12) United States Patent
Kawabata

(10) Patent No.: US 6,818,261 B2
(45) Date of Patent: Nov. 16, 2004

(54) LIQUID CRYSTAL COMPOSITION, COLOR FILTER AND LIQUID CRYSTAL DISPLAY DEVICE

(75) Inventor: Kouya Kawabata, Shizuoka-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 77 days.

(21) Appl. No.: 10/119,301

(22) Filed: Apr. 10, 2002

(65) Prior Publication Data

US 2002/0150698 A1 Oct. 17, 2002

(30) Foreign Application Priority Data

Apr. 13, 2001 (JP) ........................................ 2001-115231
Apr. 13, 2001 (JP) ........................................ 2001-115902

(51) Int. Cl.[7] .................... C09K 19/52; C09K 19/38; C09K 19/54; G02F 1/1335; G02B 5/20
(52) U.S. Cl. ................ 428/1.3; 252/299.01; 252/299.5; 349/106; 430/7
(58) Field of Search .................. 252/299.01, 299.5; 428/1.3; 430/7; 349/106

(56) References Cited

U.S. PATENT DOCUMENTS

| | | | |
|---|---|---|---|
| 5,668,614 A | | 9/1997 | Chien et al. |
| 5,989,461 A | * | 11/1999 | Coates et al. ............... 252/585 |
| 6,007,745 A | | 12/1999 | Coates et al. |
| 6,099,758 A | | 8/2000 | Verrall et al. |
| 2002/0033479 A1 | | 3/2002 | Sugiyama et al. |

FOREIGN PATENT DOCUMENTS

| | | |
|---|---|---|
| EP | 0 992 816 A1 | 4/2000 |
| JP | 10-029997 | 2/1998 |
| JP | 2000-231097 | 8/2000 |
| JP | 2001-159706 | 6/2001 |
| JP | 2001-159708 | 6/2001 |
| JP | 2001-159709 | 6/2001 |
| JP | 2002-80478 | 3/2002 |
| JP | 2002-80851 | 3/2002 |
| JP | 2002-179633 | 6/2002 |
| JP | 2002-179668 | 6/2002 |
| JP | 2002-179669 | 6/2002 |
| JP | 2002-179670 | 6/2002 |
| JP | 2002-179682 | 6/2002 |
| JP | 2002-180051 | 6/2002 |
| JP | 2002-302487 | 10/2002 |
| WO | WO 00/34808 | 6/2000 |

OTHER PUBLICATIONS

Japanese Abstract No. 2001303057, dated Oct. 31, 2001.
Japanese Abstract No. 2000154168, dated Jun. 6, 2000.
Japanese Abstract No. 2001159709, dated Jun. 12, 2001.

* cited by examiner

*Primary Examiner*—Shean C. Wu
(74) *Attorney, Agent, or Firm*—Sughrue Mion, PLLC

(57) ABSTRACT

The present invention discloses a liquid crystal composition comprising at least a liquid crystal compound including at least one polymerizing group, a chiral agent and a polymerization initiator, and being filtered using a filter having a pore size of 1 μm or less; a liquid crystal composition comprising the components of the above-described liquid crystal composition, an air-interface orientation agent and a solvent, and having a viscosity ranging from 1 to 100 cP; a color filter produced using one of these compositions; and a liquid crystal display device employing the color filter.

18 Claims, 7 Drawing Sheets

LIQUID CRYSTAL COMPOSITION, COLOR FILTER AND LIQUID CRYSTAL DISPLAY DEVICE

BACKGROUND OF THE INVENTION

1. Field of the Invention

The present invention relates to a liquid crystal composition, a color filter produced using the liquid crystal composition, and a display device including the color filter.

2. Description of the Related Art

Applications of color filters are increasingly extending such as to include mobile information terminals, personal computers, word processors, amusement machines, televisions, and the like, as well as display panels used in various electric and electronic apparatuses.

These apparatuses are conventionally provided with liquid crystal display devices. Advantages of a liquid crystal display device are that electric power consumption thereof is small and that it is thin. The liquid crystal display devices are generally divided into two groups: transmission display devices including a backlight light source and frontlight reflection display devices which do not include a light source or use an optical waveguide on the entire surface thereof. For a full-color display, usually a color filter is used. For example, a color filter used in a color liquid crystal display, and the like, generally includes red (R), green (G) and blue (B) pixels, and a black matrix formed therebetween for improving display contrast.

Majority of this type of color filters has conventionally been produced using pigment dispersion or staining. The pigment dispersion involves dispersing pigments in a photoresist, coating the photoresist on a glass substrate, and then exposing a pattern and developing. This method is excellent in patterning edge, resolution, evenness of film, and the like. However, this method has problems such that it requires a photoresist process, and that, since pigments are used, adjustment of colors is not as easy as when dyes are used. In addition, when the photoresist is applied on the substrate using spin coating, there will be a large loss of materials, and unevenness of the coating will be large when the area of the substrate is large. In the staining, a transparent resin pattern provided with photosensitivity is stained later onto a gelatin, or the like. Advantages of this method is that it produces a color filter which has a high light transmittance because of transparency of dyes, and that adjustment of colors are easy because there are wide variety of types of dyes. However, the method also has drawbacks such that the number of required steps such as a photoresist step is larger than that for the pigment dispersion.

Other known methods for producing a color filter include printing, electrodeposition, ink jet, and the like. The printing has drawbacks such that, since it prints patterns of respective colors one by one, registration of the patterns is difficult, and that, because of low pixel resolution and uneven film thickness of the resulting color filter, it is difficult to use the color filter produced by the printing method to form a highly detailed image pattern. While, an advantage of the printing method is that it uses materials efficiently. The electrodeposition can provide a color filter which has a relatively high resolution and low unevenness in colored layers, however, it has difficulties such that production steps thereof are complicated and handling of fluids is difficult. The ink jet method has had problems regarding resolution, and that colors of mutually adjacent pixels may be mixed.

The color filters (produced by the methods) described above are light-absorbing color filters, which, in theory, can transmit only one third of the light from the light source, and therefore do not have sufficient brightness. In order to compensate this drawback, for example, in the case of a transmission display device, it can be considered to increase brightness of the backlight. However, this will lead to an increase in power consumption, and will impair the advantage of the liquid crystal display device.

In order to solve these problems, U.S. Pat. No. 00/5,668,614 and WO 00/34,808 have proposed color filters employing a cholesteric polarizer, which do not require a liquid development step. The cholesteric polarizer selectively reflects circularly polarized light having predetermined wavelengths and transmits circularly polarized light having the other wavelengths. Therefore, different from the above-described color filters made of colored resins, the color filter comprising the cholesteric polarizer can reuse the once transmitted light to improve light efficiency, thereby forming a substantially bright color filter. Therefore, this type of color filter is suitable for use in a reflection liquid crystal display. Further, since the production of the color filter comprising the cholesteric polarizer does not require a developing step, and patterns having different selective reflection wavelengths can be formed in a single layer, it is also preferable in view of production costs.

As a method for forming this type of color filter which utilizes the selective reflection by the cholesteric liquid crystal layer, the applicant of this patent application has made a patent application on a method for forming a color filter layer, wherein ink comprising a polymerizing liquid crystal compound is deposited by ink jet (Japanese Patent Application No. 11-343666).

Further, the applicant has made patent application on method for forming color filter, wherein the color filter is formed by irradiating light onto a layer comprising a polymerizing liquid crystal compound and a photo-reactive chiral agent having a certain structure (Japanese Patent Application Laid-Open Nos. 2002-080851, 2002-080478, and the like). The photo-reactive chiral agent includes chiral sites and sites whose structures change when exposed to light. Since a helical twisting power (HTP) of the liquid crystal is largely altered depending, for example, on an amount of irradiated light, selective reflection over a wide wavelength range including the three primary colors: blue (B), green (G) and red (R) can be accomplished.

When a color filter is produced as described above, first, a solution containing the polymerizing liquid crystal compound and the photo-reactive chiral agent and/or a polymerizing monomer, and the like, dissolved in an organic solvent is coated on a glass substrate. However, it has been found that, if the solution is coated in this state, the resulting color filter will have various minute defects including protrusions, white dots in a colored area, black dots on a white background (black defect), deposition of foreign substances, and the like. The major cause of these defects is existence of very minute foreign substances in the solution. It has been found that, if the foreign substances, although very minute, exist in the solution, they interfere orientation of the liquid crystal layer during production of the color filter over wide areas surrounding the foreign substances, and this leads to the above-described defects. Since quality requirements for color filters are becoming increasingly severe, it is desired to eliminate these defects and to produce high quality color filters.

Another problem is a limit in contents of the liquid crystal compound in the solution, because the polymerizing liquid crystal compound does not easily dissolve in organic solvents. Therefore, a viscosity of the solution is low, and this solution cannot form an even and thick layer.

In order to solve this problem, it is considerable to add a small amount of polymer into the solution. However, the added polymer interferes the orientation of the liquid crystal, and therefore it is impossible to produce a high performance color filter in this approach.

Japanese Patent Application Laid-Open (JP-A) No. 2000-154168 discloses a cross-linking liquid crystal composition which comprises a particular macromolecular acrylic photoisomerizing chiral compound and a liquid crystal polymer, which composition can be coated in a solution state. A viscosity of this composition can be adjusted by changing a ratio of a solvent, however, the composition has a drawback that reorientation of the liquid crystal takes long time.

When a layer containing the liquid crystal composition (color filter forming layer) is formed by coating for producing a color filter, particularly in the case of a low molecular weight liquid crystal, even if the liquid crystal molecules are oriented in the horizontal direction of the substrate at the substrate side of the color filter forming layer, the liquid crystal molecules become vertical at the other side of the color filter forming layer at an air-interface side. This cause an angle of inclination (pretilt angle) of the liquid crystal molecules to continuously change in the thickness direction of the color filter forming layer. Therefore, usually, it is necessary to sandwich the layer with orientation films from both sides. However, when the liquid crystal composition is polymerized and is used as an optical film, at least one of the orientation films needs to be removed after the polymerization in order to reduce a weight and/or a thickness of the optical film. This has caused problems such as an increase in the number of required steps, for example, placement and removal of the orientation films, and an increase in wastes.

SUMMARY OF THE INVENTION

In view of the above-described problems, objects of the present invention is to provide a liquid crystal composition which can be used to produce a color filter without various defects; a color filter without various defects which is produced using the liquid crystal composition; and a liquid crystal display device employing the color filter. The present invention is further directed to provide a liquid crystal composition which controls orientation of liquid crystal molecules during production of a color filter, thereby allowing omission of one of orientation films, and suppresses contamination of dust, thereby forming an even and thick film without coating defects; a color filter having constant selective reflection wavelengths and a high reflectance, produced using the liquid crystal composition; and a liquid crystal display device employing the color filter.

The above objects are accomplished by providing the following liquid crystal composition, color filter and liquid crystal display device.

A first aspect of the liquid crystal composition of the present invention is a liquid crystal composition comprising: a liquid crystal compound, which includes at least one polymerizing group; a chiral agent; and a polymerization initiator; wherein the liquid crystal composition is filtered using a filter having a pore size of not more than 1 µm.

A second aspect of the liquid crystal composition of the present invention is the liquid crystal composition of the first aspect, wherein the filtration is carried out while the liquid crystal composition is being heated.

A third aspect of the liquid crystal composition of the present invention is the liquid crystal composition of the first aspect, wherein the chiral agent is photo-reactive.

A fourth aspect of the liquid crystal composition of the present invention is the liquid crystal composition of the first aspect, wherein the liquid crystal composition has a viscosity of not more than 100 cP.

A fifth aspect of the liquid crystal composition of the present invention is the liquid crystal composition of the first aspect, further comprising a surfactant.

A sixth aspect of the liquid crystal composition of the present invention is a liquid crystal composition comprising: a liquid crystal compound, which includes at least one polymerizing group; a chiral agent; a polymerization initiator; an air-interface orientation agent; and a solvent; wherein the liquid crystal composition has a viscosity from 1 to 100 cP.

A seventh aspect of the liquid crystal composition of the present invention is the liquid crystal composition of the sixth aspect, wherein a surface tension of the liquid crystal composition is not more than 50 mN/m.

An eighth aspect of the liquid crystal composition of the present invention is the liquid crystal composition of the sixth aspect, wherein the chiral agent is photo-reactive.

A first aspect of the color filter of the present invention is a color filter produced using a liquid crystal composition comprising: a liquid crystal compound including at least one polymerizing group; a chiral agent; and a polymerization initiator; wherein the liquid crystal composition is filtered using a filter having a pore size of not more than 1 µm, and a rate of pixel defects in the color filter is not more than 100/m².

A second aspect of the color filter of the present invention is the color filter of the first aspect, wherein the pixel defects are protrusions with heights of at least 2 µm.

A third aspect of the color filter of the present invention is the color filter of the first aspect, wherein the pixel defects are white dots in a colored area having sizes of at least 30 µm diameter.

A fourth aspect of the color filter of the present invention is the color filter of the first aspect, wherein the pixel defects are black defects having sizes of at least 30 µm diameter.

A fifth aspect of the color filter of the present invention is the color filter of the first aspect, wherein the pixel defects are foreign substances having sizes of at least 3 µm diameter.

A sixth aspect of the color filter of the present invention is the color filter of the first aspect, wherein the color filter is produced by a method comprising the steps of: disposing, on a substrate, a color filter forming layer, which includes the liquid crystal composition; and irradiating ultraviolet light onto the color filter forming layer.

A seventh aspect of the color filter of the present invention is a color filter for use in a liquid crystal display device, produced by a method comprising the steps of: forming an orientation film on a substrate; disposing, on the orientation film, a color filter comprising a liquid crystal composition; and irradiating ultraviolet light onto the color filter forming layer; wherein the liquid crystal composition has a viscosity from 1 to 100 cP and comprises: a liquid crystal compound including at least one polymerizing group; a chiral agent; a polymerization initiator; an air-interface orientation agent; and a solvent.

An eighth aspect of the color filter of the present invention is the color filter of the seventh aspect, wherein the color filter forming layer is formed by being coated using at least one of bar coating, spin coating and slit coating.

A ninth aspect of the color filter of the present invention is the color filter of the seventh aspect, wherein a thickness of the color filter forming layer from 1.5 to 4 µm.

A first aspect of the liquid crystal display device of the present invention is a liquid crystal display device comprising: a pair of substrates, at least one of which transmits light; and at least a color filter, a liquid crystal layer and a liquid crystal driving electrode disposed between the substrates; wherein the color filter is produced using a liquid crystal composition comprising a liquid crystal compound including at least one polymerizing group; a chiral agent; and a polymerization initiator, the liquid crystal composition being filtered using a filter having a pore size of not more than 1 μm, and a rate of pixel defects in the color filter is not more than 100/m².

A second aspect of the liquid crystal display device of the present invention is a liquid crystal display device comprising a color filter produced by a method comprising the steps of: forming an orientation film on a substrate; disposing, on the orientation film, a color filter forming layer comprising a liquid crystal composition; and irradiating ultraviolet light onto the color filter forming layer; wherein the liquid crystal composition includes at least one polymerizing group; a chiral agent; a polymerization initiator; an air-interface orientation agent; and a solvent, and the liquid crystal composition has a viscosity from 1 to 100 cP.

DESCRIPTION OF THE PREFERRED EMBODIMENTS

[Liquid Crystal Composition]

Figure 1A:
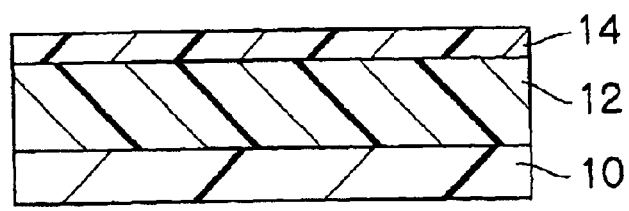
FIGS. 1A to 1I are schematic diagrams partially illustrating a process for producing a liquid crystal color filter of the present invention.

The inventor of the present invention has found that defects of a color filter (such as protrusions, white dots in a colored area, black dots on a white background (black defect), foreign substances, and the like) are due to a liquid crystal composition to be coated on a substrate. Therefore, the above-described defects of the color filter can be eliminated by filtering the liquid crystal composition with a filter having a pore size of 1 μm or less to remove very minute insoluble portions and minute foreign substances before the liquid crystal composition is coated onto the color filter substrate. By producing the color filter using the liquid crystal composition which has been filtered as described above, the above-described defects are eliminated. Since orientation of a liquid crystal during a production process of the color filter has not been interfered, a high quality color filter with high color purity and a high resolution can be provided. Further, a liquid crystal display device employing the color filter can exhibit an excellent image display performance.

Further, since the color filter of the present invention utilizes selective reflection by a cholesteric liquid crystal phase, it is not necessary to use photolithography for producing the color filter of the present invention, and therefore a significant cost reduction can be achieved.

The filtration is preferably carried out using a filter having a pore diameter of 1 μm or less, under a pressure of several tens N/cm². However, the filtration pressure is not limited to this value and may be suitably selected depending on the type, the shape, and the like, of the filter.

Further, it is preferable to perform the filtration while the liquid crystal composition to be filtered is heated. The heating temperature is 60–180° C., and preferably 100–160° C. This heating facilitates the filtration, and also provides an effect of reducing an amount of a solvent to be used.

A viscosity of the liquid crystal composition is preferably 100 cP or less from a point of view of easiness of the filtration. The viscosity can be adjusted using a solvent, or the like.

It should be noted that a size (diameter) of a foreign substance in the present invention is represented by one half of a sum of the maximum length and the minimum length of the foreign substance.

Another liquid crystal composition according to the present invention comprises at least a liquid crystal composition including at least one polymerizing group, a chiral agent, a polymerization initiator, an air-interface orientation agent (surfactant) and a solvent. A viscosity of the liquid crystal composition is 1–100 cP (mPa·s), preferably 20–100 cP, and more preferably 50–100 cP. It should be noted that the viscosity is an absolute viscosity measured with VIS-COTESTER VT550 manufactured by Haake at a temperature of 20° C.

The viscosity in a range from 1 to 100 cP provides the liquid crystal composition with an excellent coatability, and allows formation of a layer having an even thickness when the liquid crystal composition is coated to form the layer.

Further, with consideration to coatability, a surface tension of the liquid crystal composition is preferably 50 mN/m or less, more preferably 40 mN/m or less, and most preferably 30 mN/m or less. These surface tension values were measured with a surface tension balance CBVP-A3 manufactured by Kyowa Interface Science Co., Ltd. at a temperature of 20° C.

In the liquid crystal composition of the present invention, a low molecular weight liquid crystal compound having a polymerizing group (hereinafter also referred to as polymerizing liquid crystal compound) is preferably a nematic liquid crystal compound having a polymerizing group. The polymerizing group in the liquid crystal compound assures a sufficient hardening property of the resulting layer, thereby improving a heat resistance of the layer.

Specific examples of the low molecular weight liquid crystal compound having the polymerizing group include, but are not limited to, the following compounds:

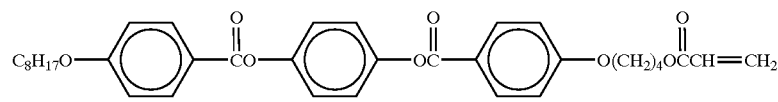
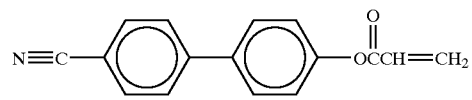
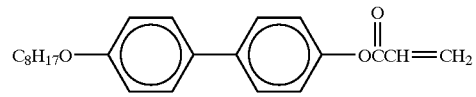
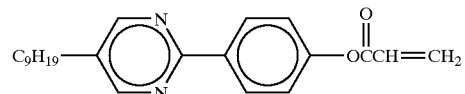
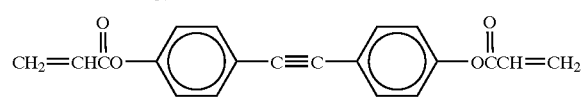
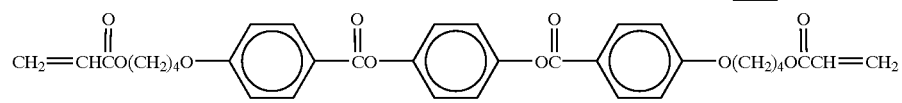
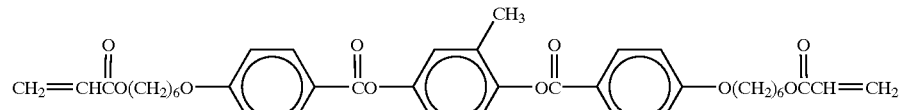
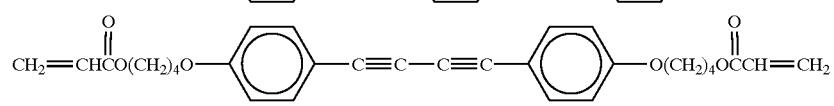
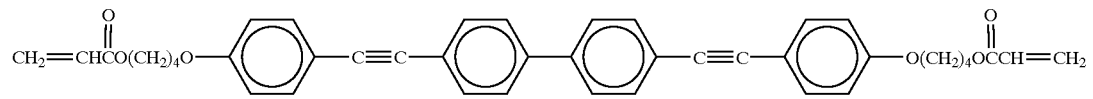
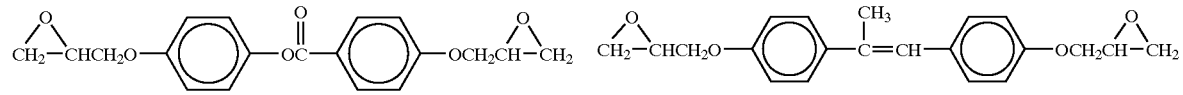
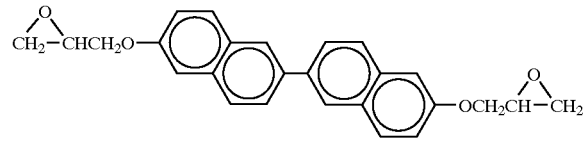
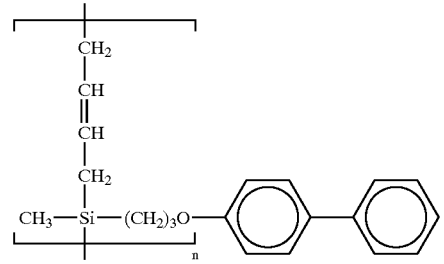
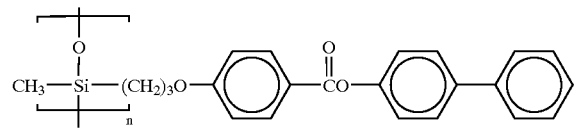
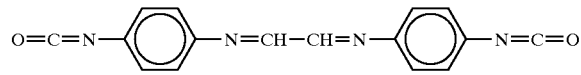
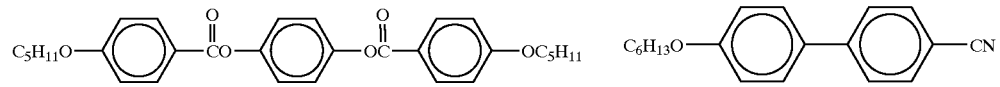

In the above formulae, n represents an integer from 1 to 1000.

Further, compounds represented by the formulae above, wherein the bonding groups of the aromatic ring are replaced with the following structures are also preferable.

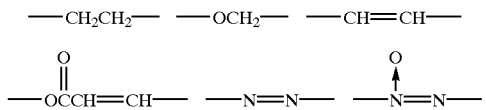

A content of the liquid crystal compound in the liquid crystal composition is preferably 30–99.9% by mass, and more preferably 50–95% by mass of the total solid components of the liquid crystal composition. If the content is less than 30% by mass, sufficient orientation cannot be carried out and desirable selective reflection colors may not be obtained.

(Chiral Agent)

Next, the chiral agent is described. The chiral agent is not particularly limited as long as it is a chiral agent which can bring the nematic liquid crystal compound into a cholesteric liquid crystal phase when it is added to the nematic liquid crystal compound. Particularly, a photo-reactive chiral agent can largely change a helical twisting power of the liquid crystal according to an amount of irradiated light, and therefore is used preferably. Besides the photo-reactive chiral agent, for example, a thermo-reactive chiral agent or a chiral agent which does not react to heat, light, and the like, can be also used.

The photo-reactive chiral agent includes chiral sites and photo-reactive sites whose structure change when exposed to light, and is a compound which largely change the helical twisting power (HTP) of the liquid crystal according to, for example, an amount of irradiated light. For increasing the helical twisting power caused by irradiation of light, the chiral agent preferably has a large degree of structural change due to light. Further, the photo-reactive chiral agent desirably has an SP value in solubility parameters which is approximate to that of the liquid crystal compound. Furthermore, if the photo-reactive chiral agent has a structure wherein one or more polymerizing bonding groups are incorporated in its molecule, heat-resistance of the liquid crystal phase is improved.

Examples of the photo-reactive site whose structure changes when exposed to light include photochromic compounds (Kingo Uchida, Msahiro Irie, Kagaku-Kogyo, vol. 64, p. 640, 1999; Kingo Uchida, Msahiro Irie, Fine Chemical, vol. 28 (9), p. 15, 1999), and the like. The structural change means decomposition, addition reaction, isomerization, dimerization, or the like, which is caused when the photo-reactive sites are exposed to light, which may be irreversible.

An example of the chiral site is asymmetric carbon (described, for example, in Hiroyuki Nohira, Kagaku-Sosetsu, No. 22, Ekisho-no-kagaku (Chemistry of Liquid Crystal), p. 73, 1994) or the like.

Examples of the photo-reactive chiral agent usable in the present invention include photo-reactive chiral agents described in Japanese Patent Application No. 11-343666, paragraph [0044]–[0047], photo-reactive chiral agents described in Japanese Patent Application Laid-Open No. 2000- 193142, paragraph [0021]–[0029], optically active compounds described in Japanese Patent Application No. 2000-380919, paragraph [0019]–[0043], optically active compounds described in Japanese Patent Application No. 2000-381001, paragraph [0020]–[0044], optically active compounds described in Japanese Patent Application No. 2000-381002, paragraph [0016]–[0040], optically active compounds described in Japanese Patent Application Laid-Open No. 2002-302487, paragraph [0015]–[0036], optically active compounds described in Japanese Patent Application No. 2000-381966, paragraph [0017]–[0050], optically active compounds described in Japanese Patent Application No. 2000-381967, paragraph [0018]–[0044], and optically active compounds described in Japanese Patent Application No. 2000-382515, paragraph [0020]–[0049].

(Solvent)

It is preferable to add one or more solvents to the first aspect of the liquid crystal composition of the present invention so as to prepare a solution containing the liquid crystal compound having the polymerizing group and the chiral agent with a viscosity suitable for coating.

The solvent is selected depending on components of the liquid crystal composition to be used, and examples thereof include organic solvents such as 2-butanone, cyclohexanone, methylene chloride, chloroform, N-methyl-2-pyrolidone, and the like.

Besides the low molecular weight liquid crystal compound having the polymerizing group and the chiral agent described above, the liquid crystal composition can include other components such as a solvent, a polymerizing monomer, a polymerization initiator, a binder resin, a surfactant, a polymerization inhibitor, a thickener, dyes, pigments, an ultraviolet absorbent, a gelatinizer, and the like, as necessary.

It is particularly preferable to use a surfactant in combination with the liquid crystal composition. For example, when the liquid crystal composition in a form of a coating solution is coated to form a layer, use of the surfactant allows three-dimensional control over orientation of liquid crystal at a surface of the layer at an air-interface, and particularly in the case of the cholesteric liquid crystal phase, selective reflection wavelengths having higher color purity can be obtained.

With the sixth aspect of the liquid crystal composition of the present invention, a solvent for dissolving the polymerizing liquid crystal compound, the chiral agent and an air-interface orientation agent to prepare a solution suitable for coating is used.

The solvent is selected depending on components of the liquid crystal composition to be used, and examples thereof include organic solvents such as 2-butanone, cyclohexanone, methylene chloride, chloroform, N-methyl-2-pyrolidone, and the like.

The liquid crystal composition can be obtained by dissolving the polymerizing liquid crystal compound, the chiral agent, the polymerization initiator and the air-interface orientation agent in the solvent. In this case, it is preferable to adjust a drying rate of the coating solution by suitably blending a solvent having relatively high volatility such as chloroform and a solvent having relatively low volatility such as cyclohexane. Further, for increasing viscosity, it is preferable to use chloroform, cyclohexane, or the like, whereby the viscosity can be easily adjusted to be within the range described above.

Besides the polymerizing liquid crystal compound, the chiral agent, the polymerization initiator, the air-interface orientation agent and the solvent, the liquid crystal composition can include other components such as a gelatinizer, a polymerizing monomer, a binder resin, a polymerization inhibitor, a thickener, dyes, pigments, an ultraviolet absorbent, and the like, as necessary.

(Polymerizing Monomer)

A polymerizing monomer may be used in combination with the liquid crystal composition of the present invention. If the polymerizing monomer is used with the liquid crystal composition, the polymerizing monomer serves to fix the helical structure (selective reflectivity) of the liquid crystal after the torsional power of the liquid crystal is changed by irradiation of light to form distribution of selective reflection wavelengths (patterning), thereby further improving the strength of the fixed liquid crystal composition. It should be noted, however, that the polymerizing monomer may not be added when the liquid crystal composition has an unsaturated bond in the same molecule.

Examples of the polymerizing monomer include a monomer having a ethylenic unsaturated bond, and specifically include, but are not limited to, polyfunctional monomers such as pentaerythritol tetracrylate, dipentaerythritol hexacrylate, and the like, and the compounds shown below:

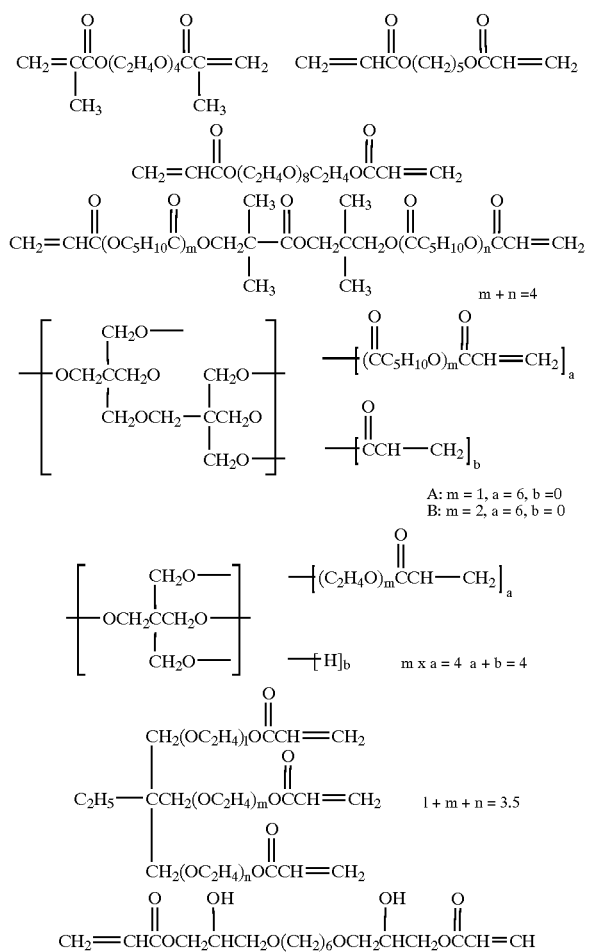

An amount of the polymerizing monomer to be added to the liquid crystal composition is preferably 0.5–50% by mass of the total solid components of the liquid crystal composition. If the amount is less than 0.5% by mass, a sufficient hardening property may not be obtained. On the other hand, if the amount exceeds 50% by mass, the polymerizing monomer may interfere orientation of the liquid crystal, and therefore a sufficient coloring may not be obtained.

(Polymerization Initiator)

When polymerization of the polymerizing liquid crystal compound is utilized to fix the helical structure of the liquid crystal formed by changing the torsional power of the liquid crystal by irradiating light so as to improve the strength of the fixed liquid crystal composition, a polymerization initiator, particularly a photopolymerization initiator is preferably added. A range of photosensitive wavelength of the photopolymerization initiator is preferably different from that of the photo-reactive chiral agent. Here, the different ranges of photosensitive wavelength means that central photosensitive wavelengths do not overlap.

When the wavelength range of photosensitivity of the photo-reactive chiral agent and that of the photopolymerization initiator are different from each other, irradiation of light for changing the HTP and that for photopolymerization do not affect each other. Therefore, while an imagewise exposure for changing the HTP is performed, photopolymerization does not progress, and patterning with an intended HTP changing rate can be achieved. On the other hand, when the photopolymerization is performed to fix the helical structure, the photo-reactive chiral agent does not react to the light, and the formed HTP pattern can be fixed with certainty, thereby achieving intended selective reflection.

The photopolymerization initiator can be selected from known photopolymerization initiators, and examples thereof include p-methoxyphenyl-2,4-bis(trichloromethyl)-s-triazine, 2-(p-butoxystylyl)-5-trichloromethyl-1,3,4-oxadiazole, 9-phenylacridine, 9,10-dimethylbenzphenazine, benzophenon/Michler's ketone, hexarylbiimidazole/mercaptobenzimidazole, benzyldimethylketal, thioxanthone/amine, triarylsulfonium hexafluorophosphate, and the like. Besides them, bisacylphosphine oxides such as bis-(2,4,6-trimethylbenzoyl)phenylphosphine oxide described in JP-A No. 10-29997, and acylphosphine oxides such as those described in DE4230555 by Lucirin TPO et al. are included.

An amount of the photopolymerization initiator to be added to the liquid crystal composition is preferably 0.1–20% by mass, and more preferably 0.5–5% by mass of the total solid components of the liquid crystal composition. If the amount is less than 0.1% by mass, hardening efficiency at a time of irradiation of light is low and hardening may take a long time. On the other hand, if the amount exceeds 20% by mass, transmittance of light in the ultraviolet-visible region may be low.

The photopolymerization initiator is preferable as the polymerization initiator. However, other polymerization initiators such as a thermopolymerization initiator can also be used.

(Gelatinizer)

As a gelatinizer, a compound which gelatinize an organic solvent is preferably used. The liquid crystal composition containing the gelatinizer is released from a gel state at a temperature for coating the liquid crystal composition, for example, about 40–100° C., and exhibits a suitable viscosity for coating. In contrast, when the temperature of a coated layer drops, for example, to the room temperature immediately after the coating, the coated layer is gelatinized or solidified.

The liquid crystal composition containing the gelatinizer is excellent in coatability, and can form a color filter forming layer which has an even and thick film. Further, when the liquid crystal composition containing the gelatinizer is coated on the substrate, the coating solution does not flow toward the underside of the substrate. When a color filter is produced from this liquid crystal composition, a thick and even color filter film can be obtained, and therefore, the color filter having constant selective reflection wavelengths and no irregularity in colors, and having sufficient reflectivity can be obtained. Further, a resolution thereof can also be improved, although the reason is not clear.

The gelatinizer is not particularly limited as long as it is a compound which can gelatinize a solvent, and examples thereof are as shown below. As the gelatinizer, with consideration to the solvent to be used in combination, one which can efficiently gelatinize the solvent by addition of a small amount thereof, and further, which does not exert harmful effect to the orientation of the liquid crystal and does not absorb light in the visible region, is suitably selected. Various gelatinizers and solvents which can be gelatinized by the gelatinizers are described in detail in "Hyomen (Surface)", Vol. 36, No. 6, pp. 1–13.

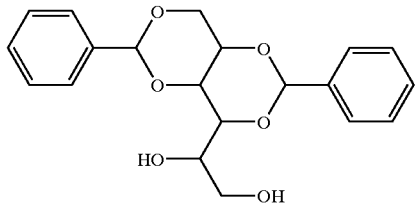
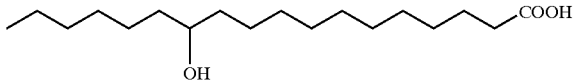
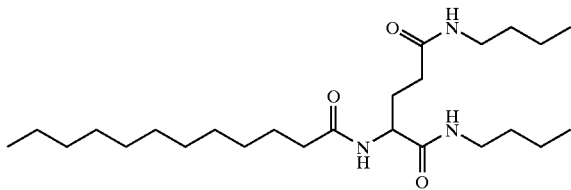
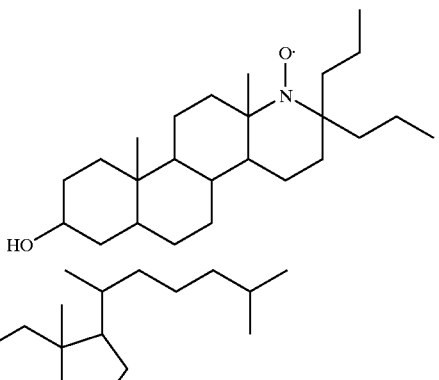
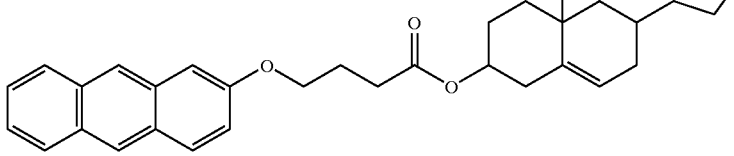
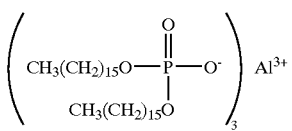
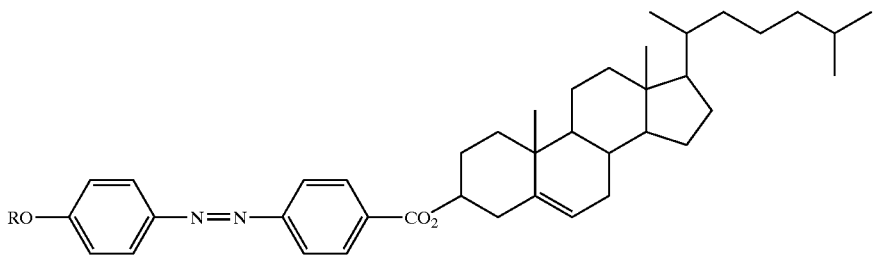
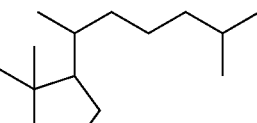
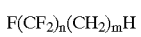
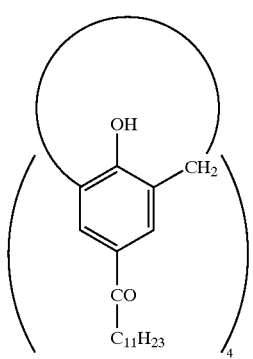

-continued
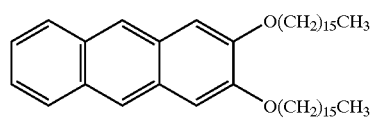
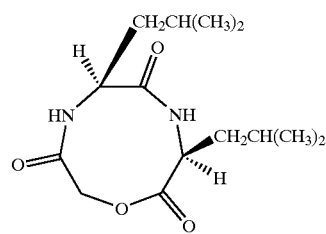
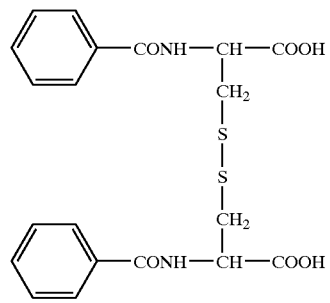
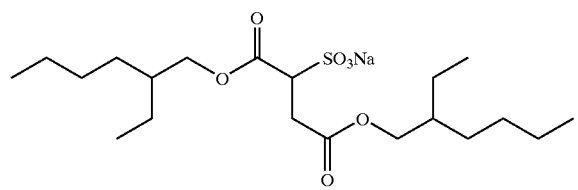
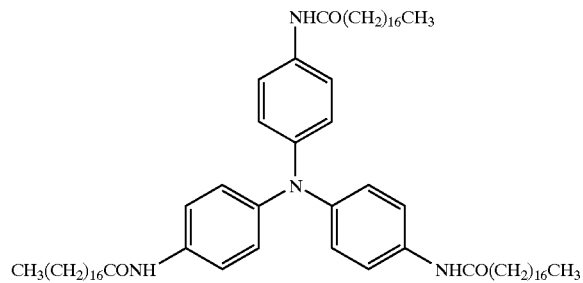
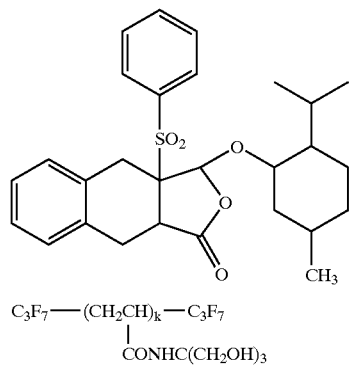
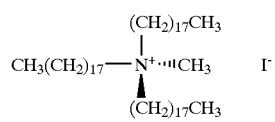
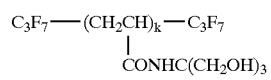
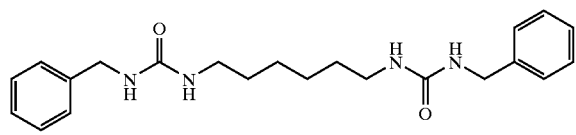
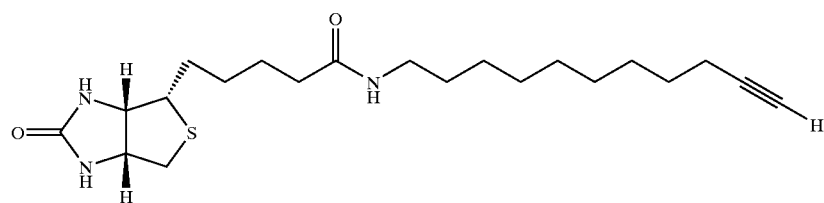
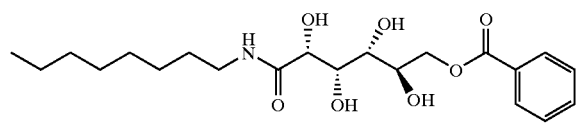
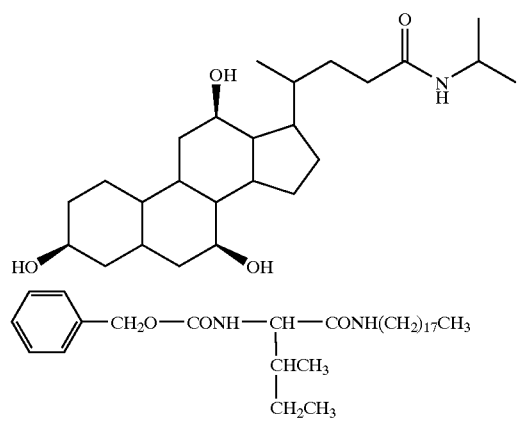
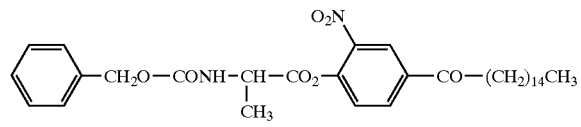

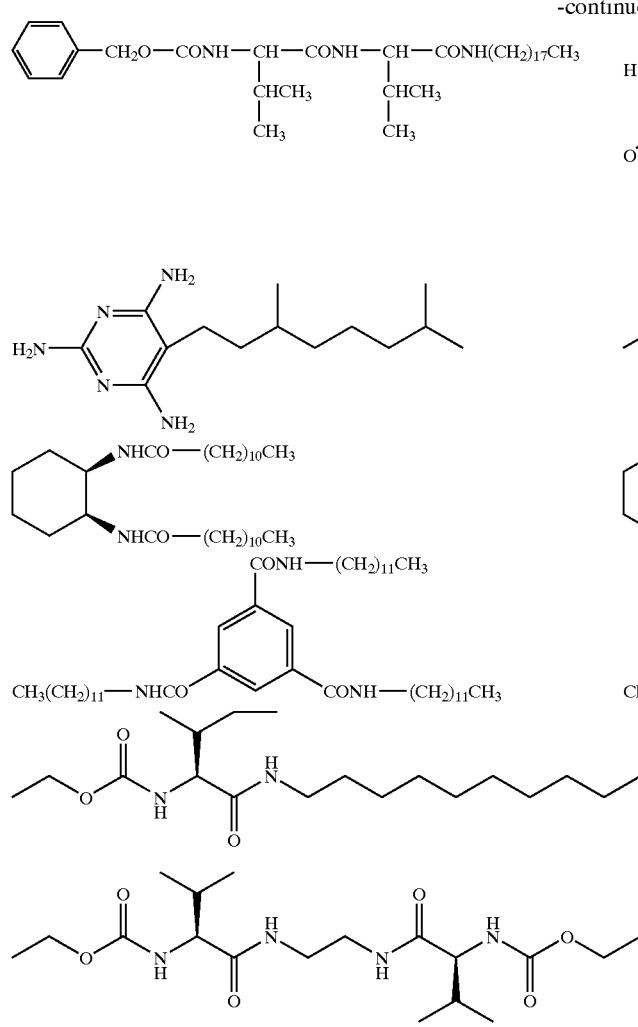
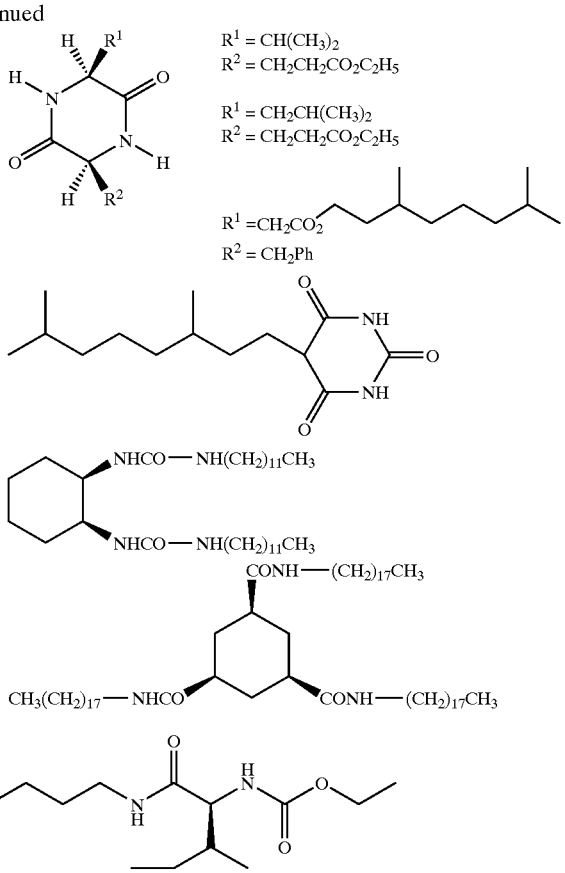

Although it depends on the type of the gelatinizer, in general, an amount of the gelatinizer to be added is 0.1–5% by mass, and preferably 1–2% by mass of the solvent to be used. If the amount is less than 0.1% by mass, a required gel state cannot be achieved. On the other hand, if the amount exceeds 5% by mass, it tends to lead to defective orientation.

Further, when the gelatinizer is added, it is possible to reduce the amount of the gelatinizer so that the liquid crystal composition is not completely gelatinized, and to perform coating using the liquid crystal composition in a half-gelatinized state or in a viscous state. In this case, the liquid crystal composition can be coated at room temperature. Among the compounds listed above, tridecyl-1,3,5-benzene tricarboxamide is a particularly preferable gelatinizer to be used in this form of coating.

(Air-Interface Orientation Agent)

The air-interface orientation agent is a surfactant having an excluded volume effect. Here, "having an excluded volume effect" means that it controls the orientation of the liquid crystal (molecules) at the air interface side. In other words, it three-dimensionally controls the spatial orientation of the liquid crystal at the air interface at the surface of the layer containing the liquid crystal composition, which layer is formed, for example, by coating. Specifically, it controls the pretilt angle of the liquid crystal molecules at the air interface side.

A requirement for a preferable air-interface orientation agent with respect to molecular structure thereof is that it includes a flexible hydrophobic site and a unit including one or more cyclic units having rigidity as a molecule (hereinafter referred to as rigid site). It should be noted that, depending on the type of the liquid crystal compound to be used, the flexible hydrophobic site can be a perfluoro chain or a long alkyl chain. Since the hydrophobic site is flexible, it can be effectively positioned at the side of air.

Further, the air-interface orientation agent may be a small molecules including about several hundreds molecules, or may be a polymer or an oligomer formed of the small molecules bonded to each other. Depending on the purpose, a polymerizing functional group can further be added.

When the liquid crystal composition contains the air-interface orientation agent, the liquid crystal molecules can be arranged parallel to the air interface since the flexible hydrophobic sites of the air-interface orientation agent exist in the direction of the air interface, the rigid sites thereof exist in the direction of the liquid crystal molecules, and the rigid sites are flat and are arranged parallel to the air interface.

On the other hand, if the rigid sites are arranged perpendicular to the air interface, the liquid crystal molecules can be arranged perpendicular to the air interface.

Specifically, a nonionic surfactant is preferable as the air-interface orientation agent, and preferable examples thereof include the compounds shown below.
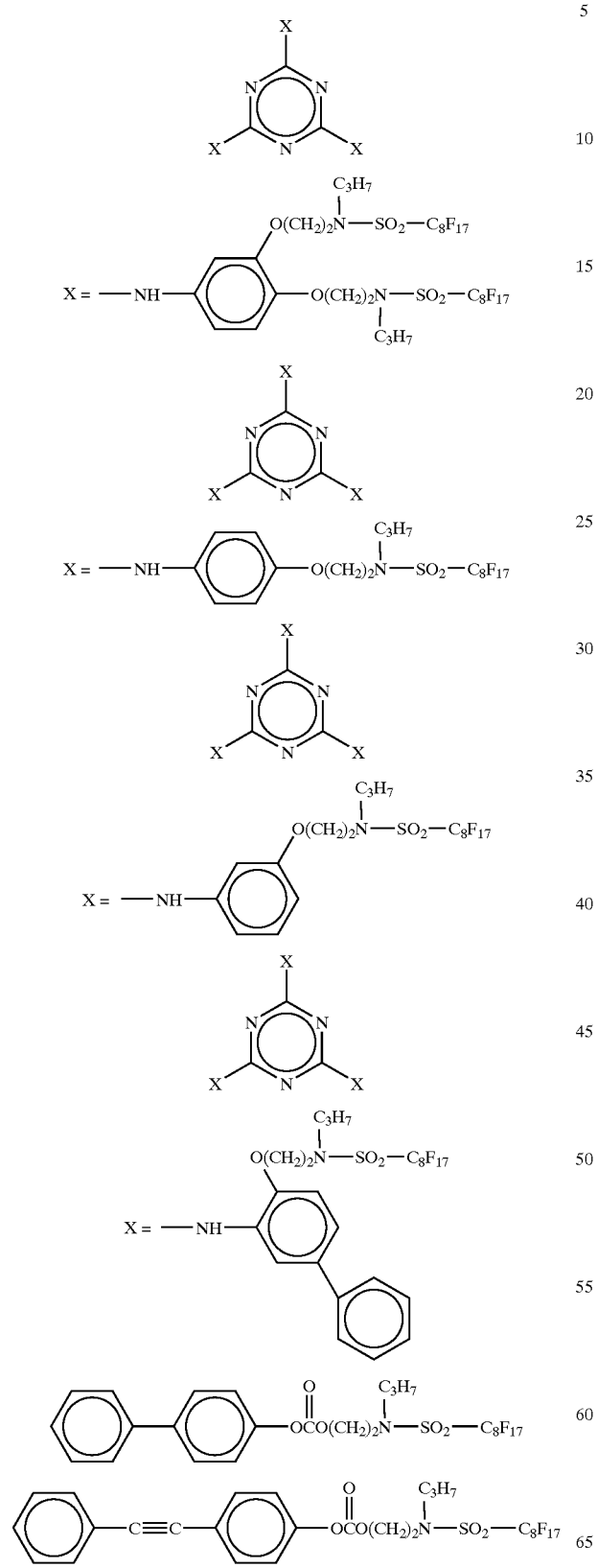
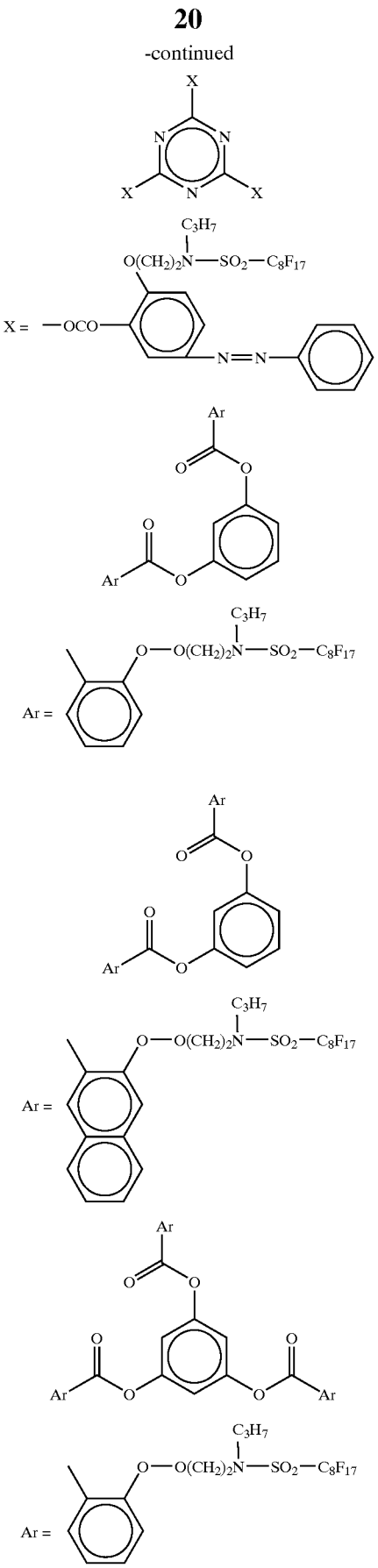

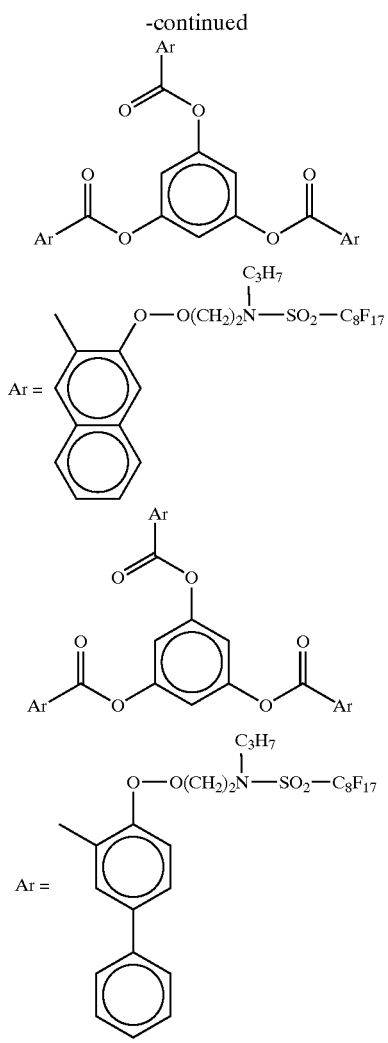

The amount of the air-interface orientation agent to be added is preferably such that it covers the surface of the layer containing the liquid crystal composition at the air interface side by a depth of one molecule, and specific amount thereof is preferably 0.05–5% by mass, and more preferably 0.5–2% by mass of the total liquid crystal composition. If the amount is less than 0.05% by mass, the air-interface orientation agent may not show its effect. On the other hand, if the amount exceeds 5% by mass, the air-interface orientation agent may associate by itself and cause phase separation between the air-interface orientation agent and the liquid crystal.

It should be noted that, if the liquid crystal composition contains the air-interface orientation agent, the surface tension thereof is lowered. In order to further lower the surface tension and improve coatability, a surfactant other than the air-interface orientation agent can also be used in combination.

[Color Filter]

The color filter of the present invention can be produced using the above-described liquid crystal composition.

The color filter of the present invention may be in a form of a sheet wherein a color filter layer comprises only the liquid crystal composition, or in a form wherein the color filter layer is provided on a desirable support or substrate, and may further be provided with other layers such as a orientation film, a protective film, and the like. The color filter may comprise two or more laminated liquid crystal layers.

A method for producing the color filter is not particularly limited, and comprises at least the steps of: forming a liquid crystal layer on a color filter substrate; irradiating imagewise light in a wavelength range of a photosensitivity of a photoreactive chiral agent in the liquid crystal layer; and photopolymerizing a liquid crystal compound including at least one polymerizing group.

The method for producing the color filter of the present invention may further comprises the step of performing an orientation treatment on a contact surface between the liquid crystal layer and the color filter substrate or a temporary support.

The liquid crystal layer can be formed by directly applying the liquid crystal composition of the present invention onto the color filter substrate. Alternatively, the liquid crystal layer can be formed by a transfer method wherein the liquid crystal layer once formed on the temporary support is closely contacted to the color filter substrate to transfer the layer onto the color filter substrate, and then the temporary support is removed.

When the photoreactive chiral agent used in the present invention is exposed to light in the wavelength range of the photosensitivity thereof, the photoreactive chiral agent makes a photo-reaction (such as isomerization, degradation, addition, dimerization, or the like) depending on the amount of the light, and consequently, a pitch of the helical structure of the liquid crystal is altered. Therefore, if the respective area of the liquid crystal layer is exposed to light having intensity which is desirable for the area, the helical structure of the relevant area changes its pitch according to the intensity of the light. Thus, the liquid crystal selectively reflects light having wavelengths which corresponds to the pitches of the areas of the helical structure, thereby presenting a plurality of colors.

In order to irradiate light having different intensities onto different areas, for example, an approach to perform exposure through an exposure mask, which has imagewise light transmittances at areas thereof, is preferably used. This approach is preferable because only one irradiation can cause the liquid crystal layer to photo-react at various degrees, thereby altering the pitches of the areas of the helical structure of the liquid crystal layer imagewise.

Thereafter, by irradiating light onto the entire surface of the liquid crystal layer to cause photopolymerization (hardening) of the liquid crystal layer, the altered pitches of the helical structure of the liquid crystal layer is fixed. In this case, as described above, it is preferable that the wavelength range of the light for causing the photo-reaction of the photo-reactive chiral agent (the wavelength range of the photosensitivity of the photo-reactive chiral agent) and that for causing the photopolymerization (when the polymerization initiator is used, the wavelength range of the photosensitivity of the polymerization initiator) are different from each other.

The wavelength of the light for causing the photo-reaction of the photo-reactive chiral agent is preferably set to a wavelength which is proximate to the range of the photosensitive wavelength of the photo-reactive chiral agent, particularly, a peak of the photosensitive wavelength of the photo-reactive chiral agent, in order to obtain a sufficient patterning sensitivity. The wavelength of the light for causing the photopolymerization is preferably set to a wavelength which is proximate to the range of the photosensitive wavelength of the polymerization initiator, particularly, a peak of the photosensitive wavelength of the polymerization initiator, in order to obtain sufficient photopolymerization sensitivity. The intensities of the light to be irradiated can be suitably selected to obtain sufficient photosensitivities.

More detailed descriptions are given below.

[First Embodiment]

A first embodiment is a method wherein the liquid crystal layer is formed on the color filter substrate by the transfer method.

(1) The step of providing the layer of the liquid crystal composition of the present invention on the temporary support to form a material to be transferred which includes at least the liquid crystal layer.

The liquid crystal layer is formed by applying the liquid crystal composition of the present invention onto the temporary support using a bar coater, a spin coater, or the like. A cushion layer comprising a thermoplastic resin (such as an acrylic resin, polyester, a urethane resin, or the like) can be provided between the liquid crystal layer and the temporary support for assuring adhesion at the time of transfer even when there are foreign substances, or the like, on a transferred material. Further, a surface of the temporary support or the cushion layer is preferably subjected to an orientation treatment (formation of an orientation film and rubbing). Furthermore, a cover film for protection can be provided on the liquid crystal layer.

(2) The step of laminating the material to be transferred on a light-transmitting substrate.

An image receiving layer may be provided on the substrate. Further, a surface of the substrate or the image receiving layer is preferably subjected to the orientation treatment in the same manner as described with respect to the above (1).

(3) The step of transferring the liquid crystal layer onto the light-transmitting substrate and removing the temporary support (transfer step).

The liquid crystal layer may include one or more additional layers which are formed, after the step (4) below, by further laminating the material to be transferred.

(4) The step of irradiating light imagewise on the liquid crystal layer through the exposure mask to form a pixel pattern which present selectively reflected colors, and further irradiating light to harden the liquid crystal layer (exposure step).

Figure 1B:
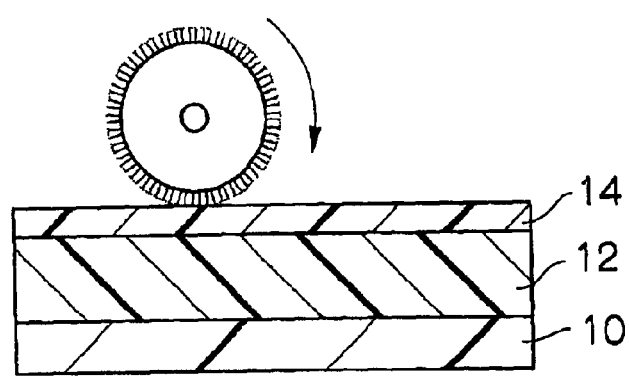
Figure 1C:
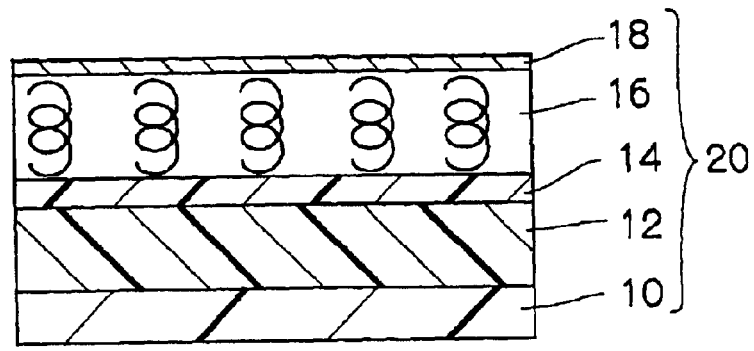

A method for producing the color filter according to the first aspect is now described with reference to the drawings. First, as shown in FIG. 1A, a cushion layer 12 is provided on a temporary support 10, and an orientation film 14 comprising polyvinyl alcohol, or the like, is laminated thereon. Then, as shown in FIG. 1B, the orientation film is subjected to a rubbing treatment. The rubbing treatment may be omitted, however, it is preferable to perform the rubbing treatment to improve an orientation property of the liquid crystal. Next, as shown in FIG. 1C, the liquid crystal composition is applied onto the orientation film 14 and is dried to form a liquid crystal layer 16. Then, a cover film 18 is provided on the liquid crystal layer 16 to prepare a material to be transferred 20.

Figure 1D:
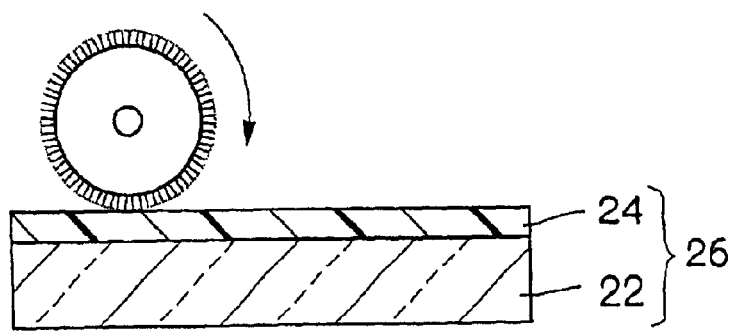

While, as shown in FIG. 1D, an orientation film 24 is formed on another substrate 22 in the same manner as shown in FIG. 1B, and the surface of the orientation film 24 is subjected to the rubbing treatment. Hereinafter, this is referred to as "color filter substrate 26".

Figure 1E:
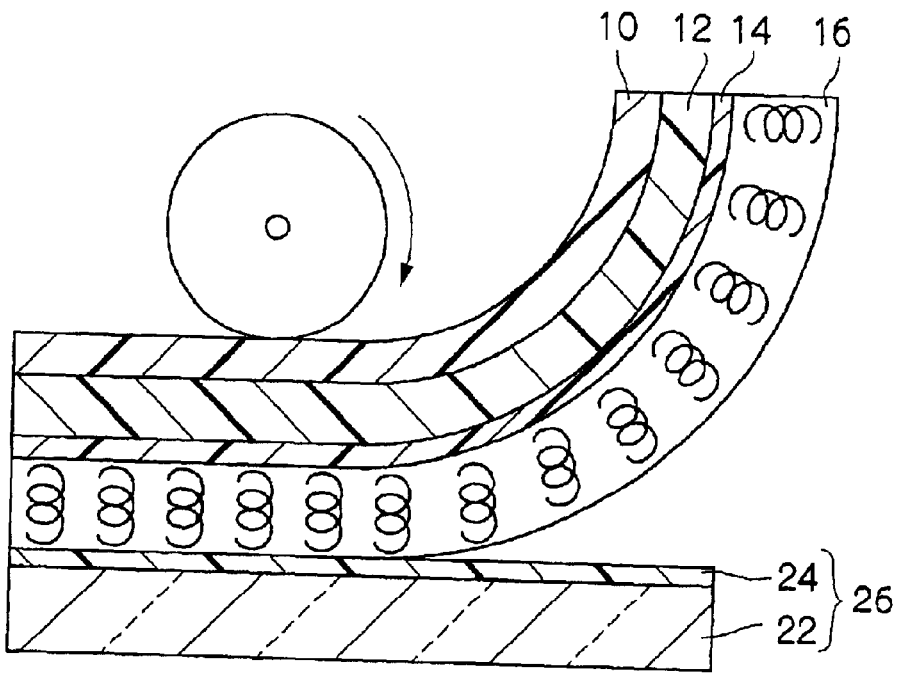
Figure 1F:
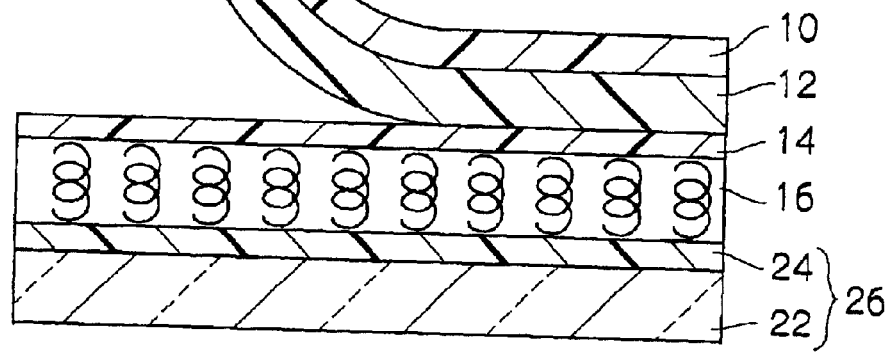

Subsequently, the cover film 18 is removed from the sheet material to be transferred 20. Then the sheet to be transferred 20 is superposed on the color filter substrate 26 so that the surface of the liquid crystal layer 16 of the sheet to be transferred 20 and the surface of the orientation film 24 of the color filter substrate 26 contact each other as shown in FIG. 1E, and is laminated through a roll rotating in a direction of the arrow in the drawing. Thereafter, as shown in FIG. 1F, the temporary support 10 and the cushion layer 12 are removed from the orientation film 14 of the material to be transferred 20. Thus, the liquid crystal layer 16 and the orientation film 14 are transferred onto the color filter substrate 26. In this case, the cushion layer 12 is not necessarily removed together with the temporary support 10.

Figure 1G:
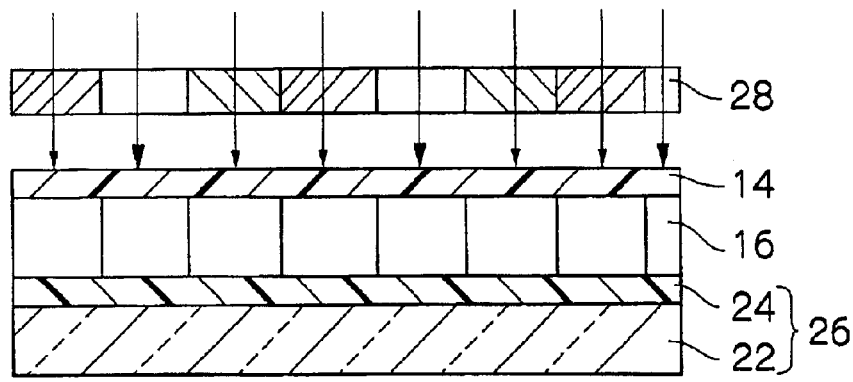

After the transfer, as shown in FIG. 1G, an exposure mask 28 including areas respectively having different transmittance and a band pass filter (not shown) are placed above the orientation film 14, and ultraviolet light is irradiated through the mask 28 to cause photo-reaction of the photo-reactive chiral agent.

Figure 1H:
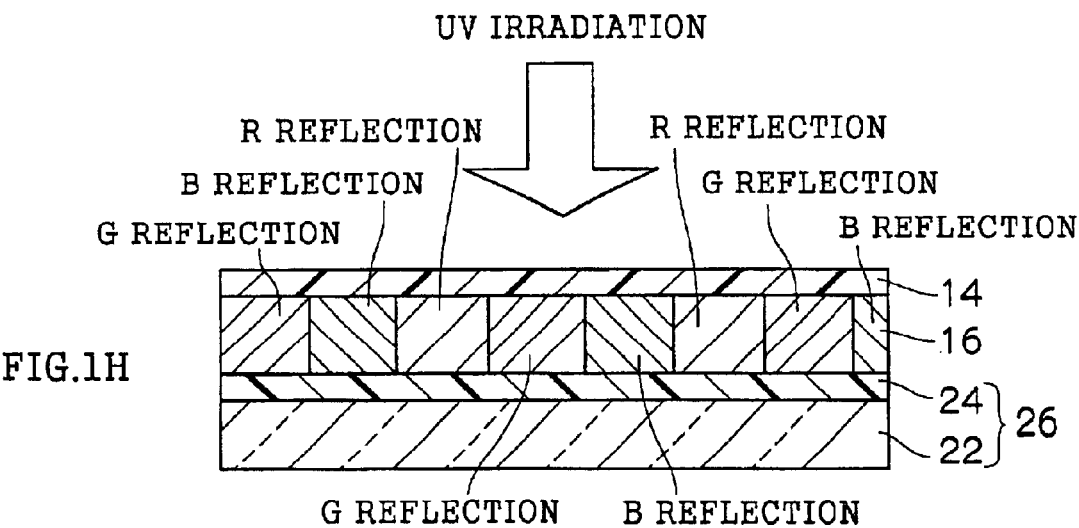

Next, as shown in FIG. 1H, a pattern formed on the liquid crystal layer 16 through the previous irradiation is fixed by irradiating ultraviolet light onto the liquid crystal layer 16 using the same light source as in the step (G) above (except that the band pass filter is not used) at an intensity different from that of light irradiation in the step (G).

Figure 1I:
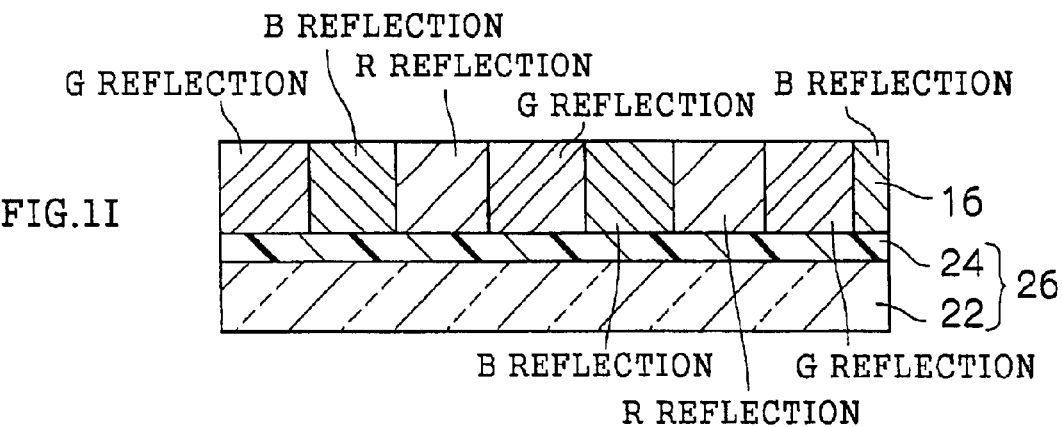

Then, using 2-butanone, chloroform, or the like, unnecessary portions on the liquid crystal layer 16 (such as the cushion layer, residue of an intermediate layer, and the like, and unexposed portions) are removed to form the liquid crystal layer including the BGR reflection areas shown in FIG. 1I.

[Second Embodiment]

A second embodiment is a method wherein the color filter forming layer is formed by coating.

Figure 2A:
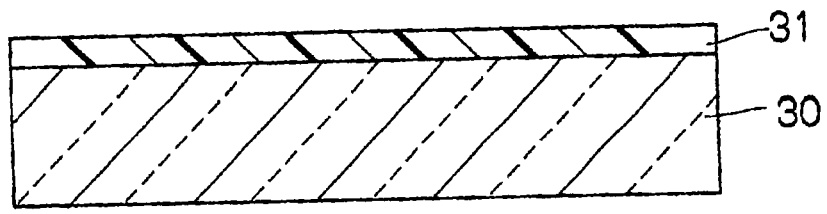
FIGS. 2A to 2F are schematic diagrams partially illustrating another process for producing a liquid crystal color filter of the present invention.
Figure 2B:
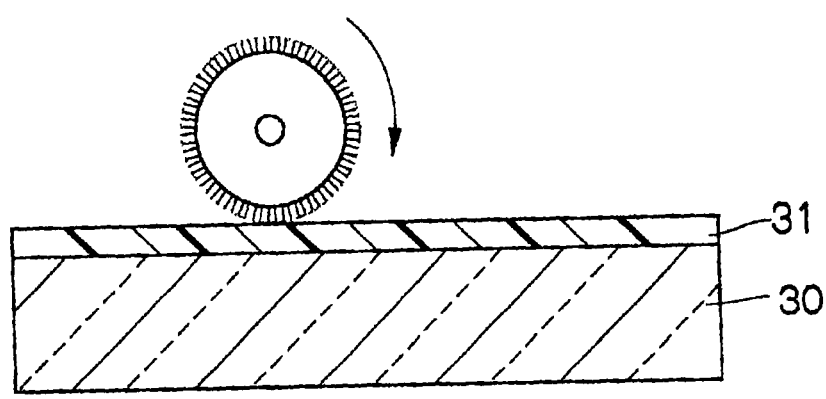

First, as shown in FIG. 2A, an orientation film 31 comprising polyvinyl alcohol, or the like, is laminated, for example, on a glass substrate 30. Then, as shown in FIG. 2B, the orientation film is subjected to the rubbing treatment. The rubbing treatment may be omitted, however, the rubbing treatment can improve the orientation property of the liquid crystal of a color filter forming layer.

Figure 2C:
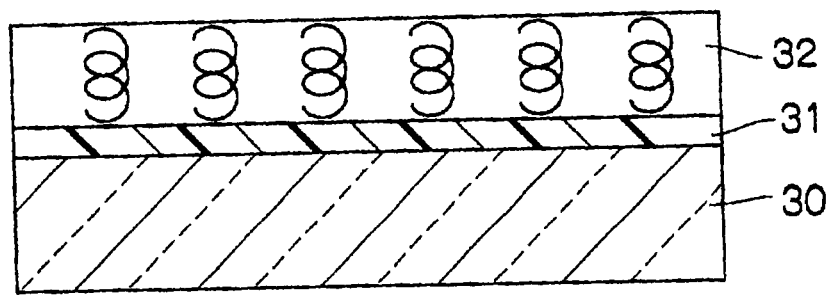

Subsequently, as shown in FIG. 2C, the liquid crystal composition of the present invention described above is coated on the orientation film 31 at a temperature of preferably 0–80° C., and more preferably 15–25° C., preferably using any one of bar coating, spin coating and slit coating, to form a color filter forming layer 32. A thickness of the color filter forming layer 32 is preferably 1.5–4 $\mu$m.

The liquid crystal composition (coating solution) of the present invention has a high viscosity and is excellent in coatability. Therefore, even if dust, or the like, is present in the coating solution, there is low tendency of causing defects, and the color filter forming layer having an even thickness can be formed with high accuracy. Further, since the liquid crystal composition of the present invention contains the air-interface orientation agent, the pretilt angle of the liquid crystal molecules can be controlled using only one orientation film at one side of the liquid crystal, not at both sides. Therefore, the production process can be simplified and production costs can be reduced.

Figure 2D:
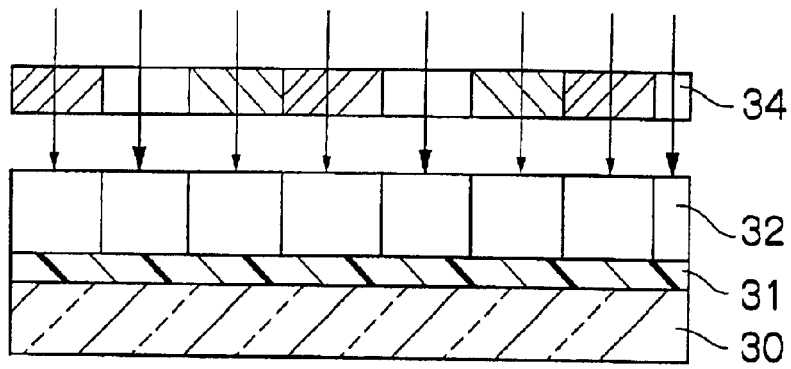

Thereafter, as shown in FIG. 2D, an exposure mask 34 including areas respectively having different transmittance and a band pass filter (not shown) are placed above the orientation film 31, and ultraviolet light is irradiated through the mask 34 and the band pass filter to cause photo-reaction of the photo-reactive chiral agent. It should be noted that the liquid crystal composition may not necessarily exhibit a liquid crystal property until the step of irradiating light onto the photo-reactive chiral agent to isomerize it (including the point of isomerization), and may be in a crystal state or in an amorphous state.

Figure 2E:
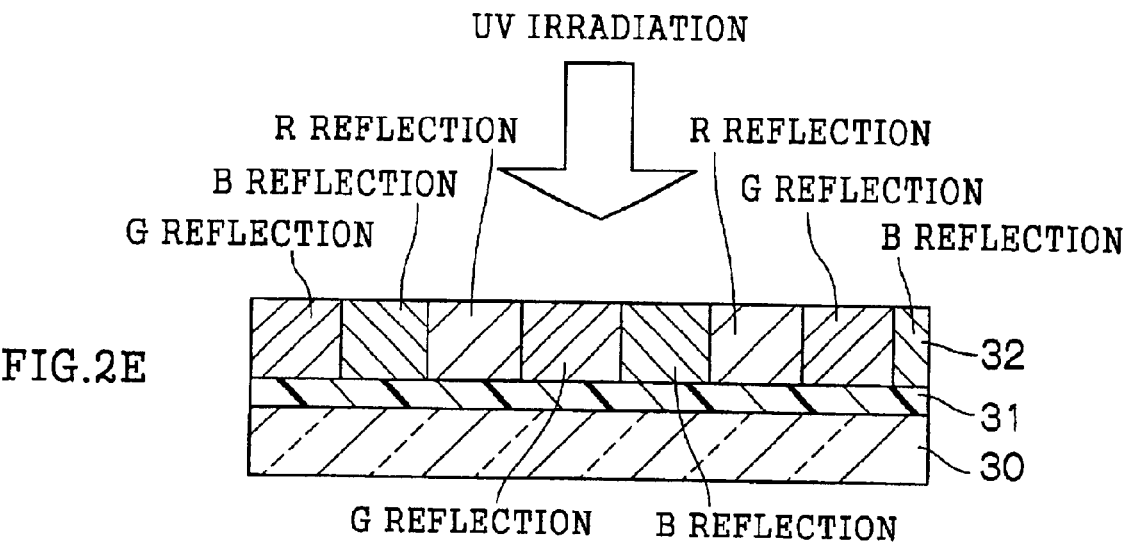

Next, as shown in FIG. 2E, a pattern formed on the color filter forming layer 32 through the previous irradiation is fixed by irradiating ultraviolet light onto the color filter forming layer 32 using the same light source as described above (except that the band pass filter is not used) at an intensity different from that of light irradiation described above.

Figure 2F:
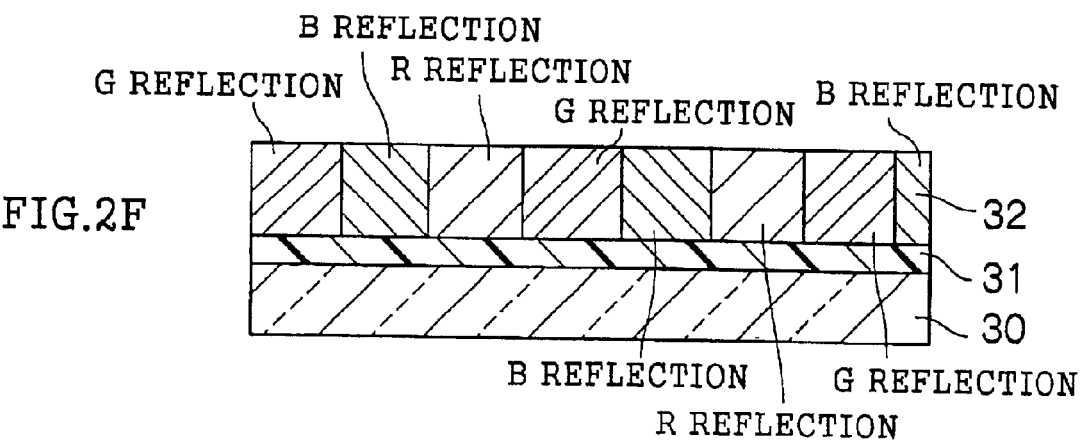

Thus, as shown in FIG. 2F, the color filter forming layer 32 including blue (B), green (G) and red (R) reflection areas can be formed.

These steps and materials used for the material to be transferred, the support, and the like, are described in detail in Japanese Patent Application Nos. 11-342896 and 11-343665.

As described above, the liquid crystal composition comprising the photo-reactive chiral agent has large changing rate of the helical twisting power of the liquid crystal corresponding to an amount of light, and this expands a range of colors which can be selectively reflected by the liquid crystal, thereby providing a color filter including three primary colors: blue (B), green (G) and red (R) with an excellent color purity.

[Liquid Crystal Display Element]

A liquid crystal display device employing the color filter of the present invention described above will now be described. The liquid crystal display device of the present invention comprises at least a support substrate and an opposing substrate, and a color filter, a liquid crystal layer and a liquid crystal driving electrode disposed between the support substrate and the opposing substrate. As the color filter, the color filter of the present invention described above is used. The liquid crystal display device of the present invention is preferably a reflection liquid crystal display device. However, this is not intended to limit the present invention, and the liquid crystal display device of the present invention can also be a transmission liquid crystal display device (such as described in JP-A No. 2000-231097).

Figure 3:
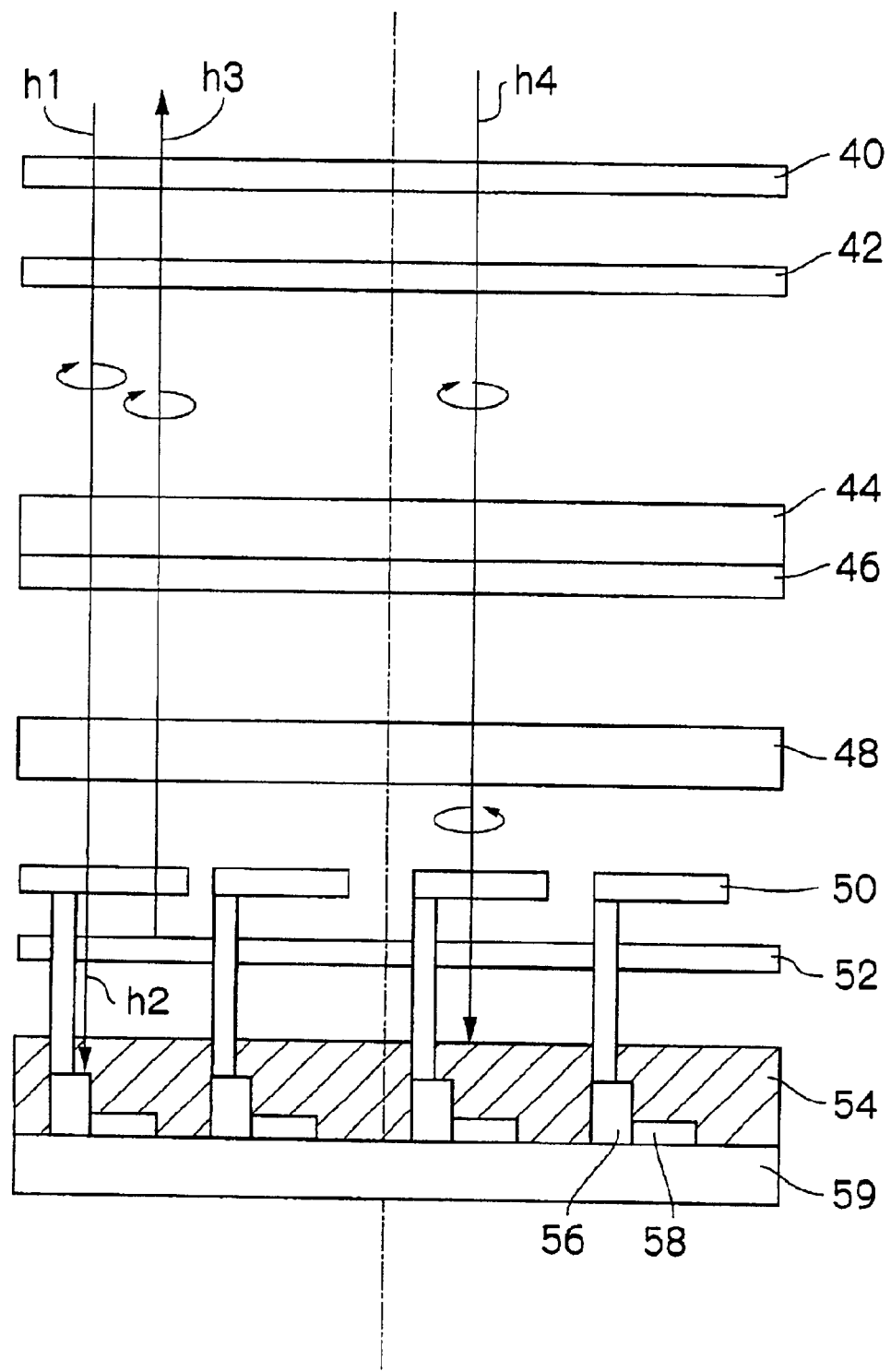
FIG. 3 is a conceptual diagram illustrating an example of an active-matrix liquid crystal display device of the present invention, in which the portion at the left of the dashed line shows reflection or absorption of circularly polarized light in a voltage-OFF state, and the portion at the right shows reflection or absorption of circularly polarized light in a voltage-ON state.

An example of the liquid crystal display device of the present invention is described with reference to the drawings, however, these are not intended to limit the present invention. FIG. 3 shows an example of an active-matrix reflection liquid crystal display device. Assuming that the upper side of FIG. 3 is an observer side, a liquid crystal display element shown in FIG. 3 comprises, from the top, a deflection plate 40, a quarter-wave plate 42, a transparent substrate 44, a transparent common electrode 46, a liquid crystal layer 48 which can be electrically driven, a transparent pixel electrode (display electrode) 50, a color filter 52 comprising a cholesteric polarizer, a light-absorbing layer 54, active elements 56 such as TFTs (thin film transistors), a metal wiring 58 for electrically connecting the active elements, and a support substrate 59, which are disposed in this order. It should be noted that, when MIMs are used as the active elements, stripe-form transparent electrodes are formed at the side of the transparent substrate 44 as scanning lines. Usually, the liquid crystal display device further includes a liquid crystal orientation film, a spacer, a sealing compound, and the like, however, these are omitted in FIG. 3.

The transparent substrate 44 and the support substrate 59 are preferably glass substrates. However, in order to reduce the weight of the liquid crystal display device and make it not easy to break, the glass substrates can be replaced with plastic substrates.

As the transparent electrodes (such as the common electrode 46, the pixel electrode 50, scanning lines, and the like), ITO films are preferably used.

The deflection plate 40 and the quarter-wave plate 42 are disposed so that an angle between a deflection surface of the deflection plate 40 and a delayed phase axis of the quarter-wave plate 42 is kept at about 45° so that light h1 entering from the observer side is emitted toward the side of the transparent substrate 44 as right- or left-handed circularly polarized light. In the example shown in FIG. 3, they are disposed so that the right-handed circularly polarized light is emitted. The quarter-wave plate used in this example is preferably of a wide band type which causes a quarter-wave phase modulation over wavelengths corresponding to the entire visible region.

The liquid crystal layer 48 to be used shows an optically isotropic phase when a driving voltage is in an OFF state, and when it is in an ON state, shows a half-wave retardation.

The transparent pixel electrode 50 for applying a voltage to the liquid crystal layer 48 is connected to the active elements (TFTs) 56, which are provided with the metal wiring 58, via through holes provided in the cholesteric polarizer 52 and the light-absorbing layer 54.

The cholesteric polarizer 52 is divided into red reflection areas, green reflection areas and blue reflection areas, and each area has a helical pitch for selectively reflecting a corresponding reflection color.

The light-absorbing layer 54, which has a sufficient optical density for absorbing all of light transmitted through the cholesteric polarizer 52, is disposed between the cholesteric polarizer 52 and the active elements (TFTs) 56 with the metal wiring 58. When no voltage is applied to the liquid crystal layer, the circularly polarized light (for example, left-handed circularly polarized light as described below), which has passed through the color filter, is re-reflected by the wiring which interconnects the active elements. Therefore, by disposing the light-absorbing layer 54 as described above, the circularly polarized light (the left-handed circularly polarized light) can be prevented from being reflected and transmitted through the color filter again and reaching the observer side.

Further, since the active elements 56 need to be kept electrically insulated from each other, it is preferable to provide the light-absorbing layer 54 with an insulative property so that the light-absorbing layer 54 can also be used as an insulative layer. However, if the light-absorbing layer 54 is not provided with the insulative property, it is necessary to provide an insulative layer between the light-absorbing layer 54 and the active elements 56 with the metal wiring 58.

The light-absorbing layer preferably absorbs light having wavelengths in the visible region, and a pigment, such as carbon black, can be contained in the light-absorbing layer. The light-absorbing layer further includes a binder polymer, and preferable examples of the binder polymer include insulative resins such as polyacetal resins, polyamide resins, acrylic resins, polycarbonate resins, and the like.

Next, referring to FIG. 3, a display operation of the reflection liquid crystal display element having the structure described above is explained. In FIG. 3, the portion at the left of the dashed centerline represents a state when the driving voltage is OFF, and the portion at the right represents a state when the driving voltage is ON.

As shown in FIG. 3, the light hi entered from the observer side is converted into right-handed circularly polarized light by the deflector 40 and the quarter-wave plate 42. The right-handed circularly polarized light is not modulated when it is transmitted through the transparent substrate 44 and the transparent common electrode 46, and enters, as the circularly polarized light, into the liquid crystal layer 48, to which no voltage is applied at this time. When no voltage is applied to the liquid crystal layer 48, it is in an optically isotropic state, and therefore transmits the circularly polarized light without modulating it. Then, the light is transmitted through the transparent pixel electrode 50, and advances toward the cholesteric polarizer (color filter) 52 with keeping its right-handed circularly polarized state. If, for example, the direction and the pitch of the helical structure of the cholesteric polarizer 52 is set to selectively reflect light in the wavelength range corresponding to red in the right-handed circularly polarized light h1, light h2 other than that corresponding to red in the incident right-handed circularly polarized light h1 is transmitted through the cholesteric polarizer 52, and reaches the light-absorbing layer 54 to be absorbed. On the other hand, the light corresponding to red in the incident right-handed circularly polarized light h1 is not transmitted through the cholesteric polarizer 52, and is reflected as right-handed circularly polarized light h3 toward the observer side. From the reason described above, the reflected right-handed circularly polarized light h3 reaches the quarter-wave plate 42 without being modulated, and is observed as linearly polarized light, whose deflection axis is parallel to the deflection surface of the deflection plate 40, due to the effects of the quarter-wave plate 42 and the deflection plate 40.

When the voltage is applied to the liquid crystal layer 48, incident light h4 enters, as right-handed circularly polarized light, into the liquid crystal layer 48, in the same manner as described above. Since the liquid crystal layer 48 has a half-wave retardation when the voltage is applied thereto, the right-handed circularly polarized light is modulated and emitted from the liquid crystal layer 48 as left-handed circularly polarized light, and is transmitted through the cholesteric modulation element 52, which exhibits the selective reflection only to right-handed circularly polarized light. The transmitted light is absorbed by the light-absorbing layer 54, and therefore no light is reflected to the observer side.

Figure 4:
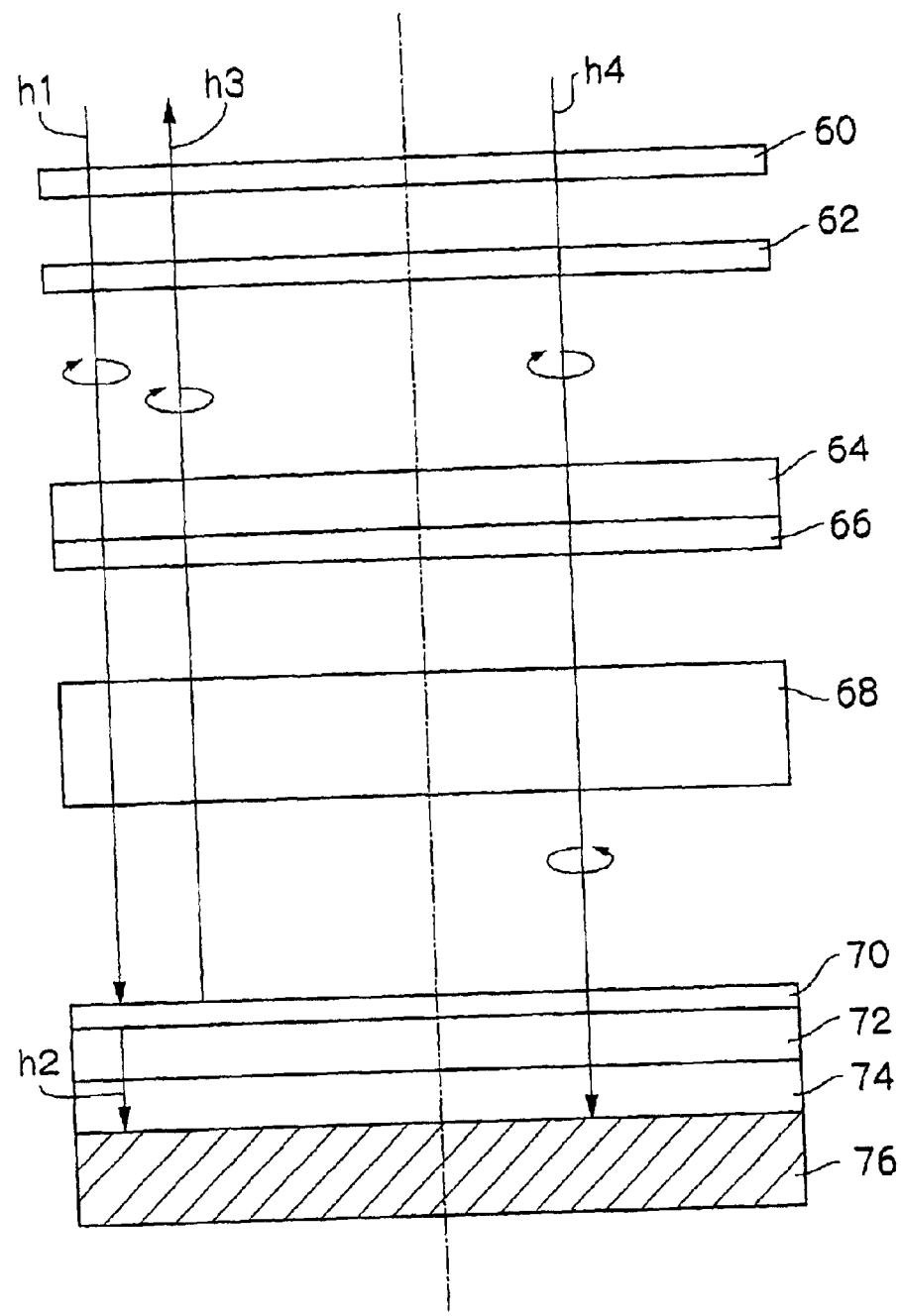
FIG. 4 is a conceptual diagram illustrating an example of a simple-matrix liquid crystal display device of the present invention, in which the portion at the left of the dashed line shows reflection or absorption of circularly polarized light in a voltage-OFF state, and the portion at the right shows reflection or absorption of circularly polarized light in a voltage-ON state.

Next, another embodiment of the present invention is described with reference to FIG. 4. FIG. 4 shows an example of a simple-matrix reflection liquid crystal display element. Assuming that the upper side of the drawing is an observer side, the reflection liquid crystal display device shown in FIG. 4 comprises, from the top, a deflection plate 60, a quarter-wave plate 62, transparent substrate 64, a transparent scan electrode 66, a liquid crystal layer 68 which can be electrically driven, a transparent signal electrode 70, a color filter 72 comprising a cholesteric polarizer, a transparent support substrate 74 and a light-absorbing layer 76, which are disposed in this order.

The transparent substrate 64, the transparent support substrate 74, the transparent (scan/signal) electrodes 66 and 70, the deflection plate 60, the quarter-wave plate 62, the liquid crystal layer 68 and the color filter 72 are the same as those shown in FIG. 3, and function in the same manner.

The transparent signal electrode 70 for applying the voltage to the liquid crystal layer 68 is disposed between the color filter 72 comprising the cholesteric polarizer and the liquid crystal layer 68.

The light-absorbing layer 76, which has a sufficient optical density for absorbing all of the light transmitted through the cholesteric polarizer 72 and the transparent support substrate 74, is disposed on a surface of the transparent support substrate 74 at the opposite side to the cholesteric polarizer 72.

In the liquid crystal display device shown in FIG. 4, the light beam h1 in the case where no voltage is applied to the liquid crystal layer and the light beam h4 in the case where the voltage is applied to the liquid crystal layer are respectively reflected or absorbed in the same manner as those in the case of the liquid crystal display device shown in FIG. 3. The light beam h1 is reflected by the color filter 72, and progresses toward the observer side as the light beam h3. On the other hand, the light beam h4 is transmitted through the color filter and the transparent substrate 74, and is absorbed by the light-absorbing layer 76, and therefore is not reflected to the observer side.

EXAMPLES

The present invention will now be described in more detail by way of examples. However, the examples are not intended to limit the present invention.

Example 1

In this example, a color filter was produced using a liquid crystal composition of the present invention.
(1) Preparation of a Liquid Crystal Composition
A liquid crystal composition, whose composition was as shown below, was prepared, and was filtered using a commercially available filter (MINISART having a pore size of 0.2 μm, manufactured by Sartorius). A filtration pressure was about 19.6 N/cm².
[Formula of a Coating Solution]

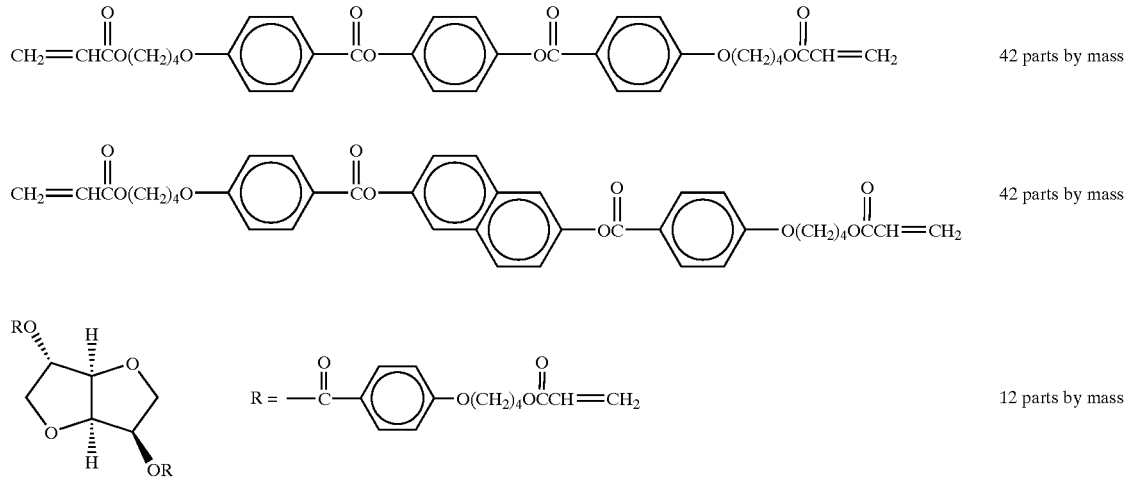

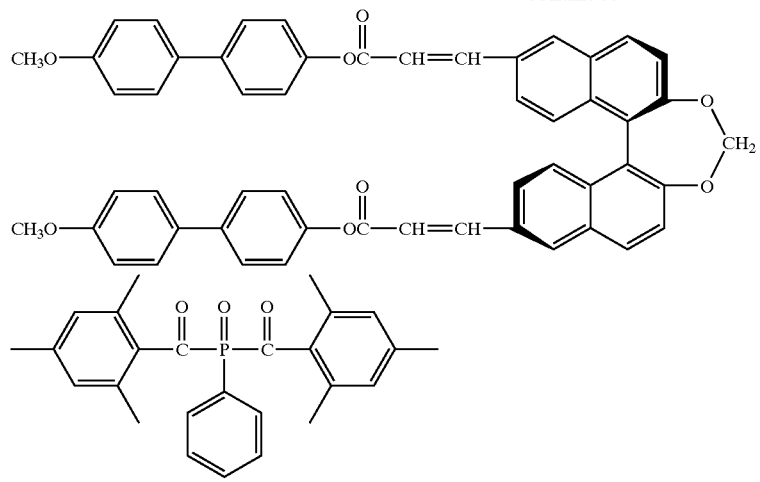

| | |
|---|---|
| | 5 parts by mass |
| | 2 parts by mass |
| Dipentaerythritol hexacrylate | 3 parts by mass |
| Cyclohexanone | 400 parts by mass |

(2) Production of a Color Filter
i) Preparation of a Color Filter Substrate

A polyimide orientation film (LX-1400 manufactured by Hitachi Chemistry Dupont KK) coating solution was coated on a glass substrate using a spin coater, dried in an oven at 100° C. for 5 minutes, and then sintered in the oven at 250° C. for 1 hour to form an orientation film. Further, a surface of the film was rubbed for orientation to produce a glass substrate with an orientation film.

ii) Formation of a Color Filter Layer

Using a spin coater, the liquid crystal composition prepared in the above (1) (at a temperature of 80° C.) was coated on the orientation film of the glass substrate with the orientation film prepared in the above i), so that a thickness of the coated layer became about 2 μm, and was dried in the oven at 100° C. for 2 minutes to form a liquid crystal layer.

Subsequently, the glass substrate with the liquid crystal layer formed thereon was put on a hot plate at 100° C. so that a surface of the glass substrate contacted to the hot plate, and was kept in this state for 5 minutes. Further, an extra high pressure mercury lamp was disposed on the liquid crystal layer via a photo mask, which includes areas having three different transmittances (0%, 46% and 92%) and arranged so as to correspond to red pixels, green pixels and blue pixels, and a band pass filter having a center wavelength of 365 nm. Then, light from the extra high pressure mercury lamp was irradiated on the liquid crystal layer through the photo mask and the band pass filter to effect patterning. An irradiation energy at this time was 600 mJ/cm$^2$ for the areas corresponding to blue pixels, and an irradiation intensity was 30 mW/cm$^2$.

Then, the photo mask and the band pass filter were removed, and the entire surface of the liquid crystal layer was further exposed to light from the extra high pressure mercury lamp, which was the same as that described above, at an irradiation energy of 500 mJ/cm$^2$ while nitrogen gas was blown, to cause polymerization and hardening. Then, in order to further promote hardening of the color filter layer, the color filter layer was calcined in the oven at 220° C. for 20 minutes, and a color filter having a pattern of red, green and blue pixels formed thereon with high color purity was obtained.

The resulted color filter was observed for defects (such as protrusions, white dots in a colored area, black dots on a white background (black defect), foreign substances, or the like) using a light microscope, and a rate of the observed defects was 2/m$^2$.

Example 2

A liquid crystal display device having a structure such as one shown in FIG. 4 was produced.

(1) Preparation of a Transparent Support Substrate

A borosilicate glass substrate having a thickness of 1.1 mm was washed and dried.

(2) Formation of a Light-Absorbing Layer, a Color Filter Layer, a Transparent Signal Electrode and an Orientation Film on the Transparent Support Substrate A light-absorbing layer solution containing carbon black and an insulative resin (polyvinyl butyral) (30% by mass of carbon black was added to the insulative resin) was coated on the transparent support substrate prepared in (1) described above using spin coating, and was dried to form a light-absorbing layer having a dry thickness of 2 μm.

A color filter was formed on a surface of the transparent support substrate at a side opposite to the light-absorbing layer in the same manner as described in the Example 1.

Then, an ITO film having a thickness of 0.1 μm was formed on the color filter layer by sputtering, and was patterned by ordinary photolithography to form a stripe-like transparent signal electrode. A polyimide orientation film (LX-1400 manufactured by Hitachi Chemistry Dupont KK) coating solution was coated on the transparent signal electrode using a spin coater, dried in an oven at 100° C. for 5 minutes, and then calcined in the oven at 250° C. for 1 hour to form the orientation film. Further, a surface of the film was rubbed for orientation.

(3) Preparation of a Transparent Substrate (Opposing Substrate)

An ITO film having a thickness of 0.1 μm was formed by sputtering on an opposing glass substrate having a thickness of 1.1 mm. Then, a stripe-like transparent scan electrode was formed in the same manner as that for the transparent signal electrode described above, and orientation treatment was carried out in the same manner as described above.

(4) Preparation of a Liquid Crystal Cell

The surface, which had been subjected to the orientation treatment, of the transparent support substrate provided with the color filter, and the like, and the surface, which had been subjected to the orientation treatment, of the opposing substrate were pasted together with a 2 μm spacing therebetween, and the liquid crystal was injected into the space. The liquid crystal used here was one which showed homeotropic orientation when the voltage was ON and a half-wave retardation when the voltage was OFF.

A quarter-wave plate (SUMIKALIGHT manufactured by Sumitomo Chemical Company Ltd.) and a deflection plate (SH-1832AW manufactured by Sumitomo Chemical Company Ltd.) were attached to the opposing substrate side of the liquid crystal cell through an adhesive.

The liquid crystal display device produced as described above employed the color filter of the Example 1, and therefore, the liquid crystal display device having high color purity and high resolution display performance could be obtained.

Comparative Example 1

A liquid crystal composition was prepared in the same manner as in Example 1, except that filtration was not carried out. Then, a color filter was produced using the liquid crystal composition.

In this example, the rate of the defects such as described above was 500/m$^2$.

The color filter of the present invention is produced using the liquid crystal composition which has been subjected to filtration as described above. Since the liquid crystal composition of the present invention does not include the minute foreign substances described above, orientation of the liquid crystal is not interfered during the production process of the color filter. Therefore, the high quality color filter having high color purity and high resolution can be obtained. Further, the liquid crystal display device employing the color filter can exhibit an excellent image display performance.

In addition, since the color filter of the present invention utilizes selective reflection by the cholesteric liquid crystal layer, there is no need of using photolithography for producing it, and this enables a significant cost reduction.

Example 3

In this example, a color filter was produced using another liquid crystal composition of the present invention.

(1) Preparation of a Liquid Crystal Composition

First, 17.2 parts by mass of compound a (a polymerizing liquid crystal compound), 2.2 parts by mass of compound b (a chiral agent), 0.6 parts by mass of compound c (a polymerization initiator), and 0.04 parts by mass of compound d (air-interface orientation agent) shown below were dissolved in a solvent (80 parts by mass of cyclohexane) to prepare a coating solution.

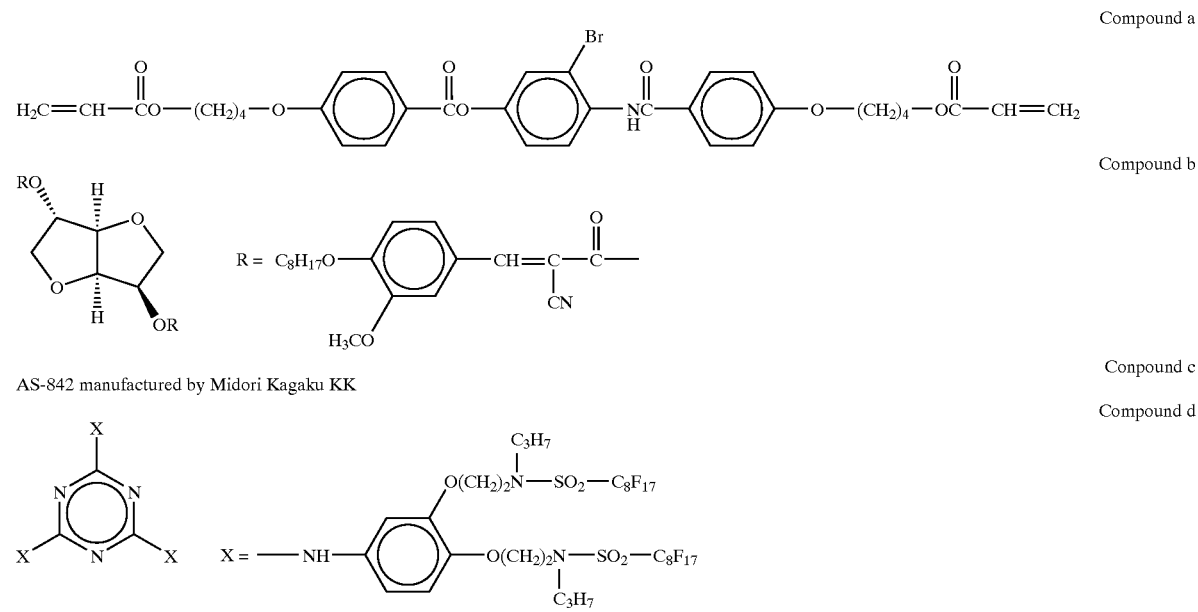

AS-842 manufactured by Midori Kagaku KK (2) Color Filter

A polyimide orientation film (LX-1400 manufactured by Hitachi Chemistry Dupont KK) coating solution was coated on a glass substrate using a spin coater, dried in an oven at 100° C. for 5 minutes, and then calcined in the oven at 250° C. for 1 hour to form an orientation film. Further, a surface of the film was rubbed for orientation to produce a glass substrate with an orientation film.

Using a spin coater, the liquid crystal prepared in the above (1) (at a temperature of 80° C.) was coated on the orientation film of the glass substrate with the orientation film described above, so that a thickness of the coated layer became about 2 μm, and was dried in the oven at 100° C. for 2 minutes to form a color filter forming layer.

Subsequently, the glass substrate with the liquid crystal layer formed thereon was put on a hot plate at 100° C. so that a surface of the glass substrate contacted to the hot plate, and was kept in this state for 5 minutes to cause the color filter forming layer to present colors. Further, an extra high pressure mercury lamp was disposed on the color filter forming layer via a photo mask, which includes areas having three different transmittances (0%, 46% and 92%) and arranged so as to correspond to red pixels, green pixels and blue pixels, and a band pass filter having a center at a wavelength of 365 nm. Then, light from the extra high pressure mercury lamp was irradiated on the color filter forming layer through the photo mask and the band pass filter to effect patterning. An irradiation energy was 600 mJ/cm$^2$ for the areas corresponding to blue pixels, and an irradiation intensity was 30 mW/cm$^2$.

Then, the photo mask and the band pass filter were removed, and the entire surface of the color filter forming layer was further exposed to light from the extra high pressure mercury lamp, which was the same as that described above, at an irradiation energy of 500 mJ/cm$^2$ while nitrogen gas was blown, to cause polymerization and hardening. Then, in order to further promote hardening of the color filter forming layer, the color filter forming layer was calcined in the oven at 220° C. for 20 minutes, and a color filter having a pattern of red, green and blue pixels formed thereon with high color purity was obtained.

Since the liquid crystal composition had an excellent coatability, the resulted color filter had an even thickness of about 2 μm, as described above. Thus, the color filter having constant selective reflection wavelengths and a sufficient reflectance was produced.

(3) Liquid Crystal Display Device

Next, a liquid crystal display device having a structure such as one shown in FIG. 3 was produced.

(i) Preparation of a Transparent Support Substrate

A borosilicate glass substrate having a thickness of 1.1 mm was washed and dried.

(ii) Formation of a Light-Absorbing Layer, a Color Filter Layer, a Transparent Signal Electrode and an Orientation Film on the Transparent Support Substrate A light-absorbing layer solution containing carbon black and an insulative resin (polyvinyl butyral) (30% by mass of carbon black was added to the insulative resin) was coated on the transparent support substrate prepared in (i) described above using spin coating, and was dried to form a light-absorbing layer having a dry thickness of 2 μm.

The above described color filter was disposed on a surface of the transparent support substrate at the opposite side to the light-absorbing layer.

Then, an ITO film having a thickness of 0.1 μm was formed on the color filter layer by sputtering, and was patterned by ordinary photolithography to form a stripe-like transparent signal electrode. A polyimide orientation film (LX-1400 manufactured by Hitachi Chemistry Dupont KK) coating solution was coated on the transparent signal electrode using a spin coater, dried in an oven at 100° C. for 5 minutes, and then calcined in the oven at 250° C. for 1 hour to form the orientation film. Further, a surface of the film was rubbed for orientation.

(iii) Preparation of a Transparent Substrate (Opposing Substrate)

An ITO film having a thickness of 0.1 μm was formed by sputtering on an opposing glass substrate having a thickness of 1.1 mm. Then, a stripe-like transparent scan electrode was formed in the same manner as that for the transparent signal electrode described above, and orientation treatment was carried out in the same manner as described above.

(iv) Preparation of a Liquid Crystal Cell

The surface, which had been subjected to the orientation treatment, of the transparent support substrate provided with the color filter, and the like, and the surface, which had been subjected to the orientation treatment, of the opposing substrate were pasted together with a 2 μm spacing therebetween, and the liquid crystal was injected into the space. The liquid crystal used here was one which showed homeotropic orientation when the voltage was ON and a half-wave retardation when the voltage was OFF.

A quarter-wave plate (SUMIKALIGHT manufactured by Sumitomo Chemical Company Ltd.) and a deflection plate (SH-1832AW manufactured by Sumitomo Chemical Company Ltd.) were attached to the opposing substrate side of the liquid crystal cell through an adhesive.

The liquid crystal display device produced as described above employed the color filter produced as described above, whose coating layer had the even film thickness of about 2 μm. Therefore, the color filter, which had a sufficiently high reflectance, and therefore could display an image with sufficient brightness, could be obtained.

Since the liquid crystal composition of the present invention has a viscosity of 1–100 cP, it can form an even and thick film when being coated. Therefore, even when a dust is present in the coating solution, defects are less likely to be created during coating. Further, since the liquid crystal composition of the present invention comprises the air-interface orientation agent, pretilt angle of the liquid crystal molecules can be controlled during production of the color filter. Therefore, there is no need of placing the orientation film at both sides of the liquid crystal layer during the production process, and one orientation film placed at one side of the liquid crystal layer is sufficient. This enables simplification of the production process and a cost reduction. In addition, the color filter which is produced using the above-described liquid crystal composition has constant selective reflection wavelengths and a sufficient reflectance. Further, the liquid crystal display device employing the color filter described above can display with a sufficient brightness without using a special illuminating means.

What is claimed is:

1. A liquid crystal composition comprising: a liquid crystal compound, which includes at least one polymerizing group; a chiral agent; and a polymerization initiator; wherein the liquid crystal composition is filtered using a filter having a pore size of not more than 1 μm, wherein the filtration is carried out while the liquid crystal composition is being heated.

2. A liquid crystal composition according to claim 1, wherein the chiral agent is photo-reactive.

3. A liquid crystal composition comprising: a liquid crystal compound, which includes at least one polymerizing group; a chiral agent; and a polymerization initiator; wherein the liquid crystal composition is filtered using a filter having a pore size of not more than 1 μm, wherein the liquid crystal composition has viscosity of not more than 100 cP.

4. A liquid crystal composition comprising: a liquid crystal compound, which includes at least one polymerizing group; a chiral agent; and a polymerization initiator; wherein the liquid crystal composition is filtered using a filter having a pore size of not more than 1 μm, further comprising a surfactant.

5. A liquid crystal composition comprising: a liquid crystal compound, which includes at least one polymerizing group; a chiral agent; a polymerization initiator; an air-interface orientation agent; and a solvent; wherein the liquid crystal composition has a viscosity from 1 to 100 cP.

6. A liquid crystal composition according to claim 5, wherein a surface tension of the liquid crystal composition is not more than 50 mN/m.

7. A liquid crystal composition according to claim 5, wherein the chiral agent is photo-reactive.

8. A color filter produced using a liquid crystal composition comprising: a liquid crystal compound including at least one polymerizing group; a chiral agent; and a polymerization initiator; wherein the liquid crystal composition is filtered using a filter having a pore size of not more than 1 μm, and a rate of pixel defects in the color filter is not more than 100/m$^2$.

9. A color filter according to claim 8, wherein the pixel defects are protrusions with heights of at least 2 μm.

10. A color filter according to claim 8, wherein the pixel defects are white dots in a colored area having sizes of at least 30 μm diameter.

11. A color filter according to claim 8, wherein the pixel defects are black defects having sizes of at least 30 μm diameter.

12. A color filter according to claim 8, wherein the pixel defects are foreign substances having sizes of at least 3 μm diameter.

13. A color filter according to claim 8, wherein the color filter is produced by a method comprising the steps of:
    disposing, on a substrate, a color filter forming layer, which includes the liquid crystal composition; and
    irradiating ultraviolet light onto the color filter forming layer.

14. A color filter for use in a liquid crystal display device, produced by a method comprising at least the steps of:
    forming an orientation film on a substrate;
    disposing, on the orientation film, a color filter comprising a liquid crystal composition; and
    irradiating ultraviolet light onto the color filter forming layer;
    wherein the liquid crystal composition has a viscosity from 1 to 100 cP and comprises: a liquid crystal compound including at least one polymerizing group; a chiral agent; a polymerization initiator; an air-interface orientation agent; and a solvent.

15. A color filter according to claim 14, wherein the color filter forming layer is formed by being coated using at least one of bar coating, spin coating and slit coating.

16. A color filter according to claim 14, wherein thickness of the color filter forming layer is from 1.5 to 4 μm.

17. A liquid crystal display device comprising: a pair of substrates, at least one of which transmits light; a color filter, a liquid crystal layer and a liquid crystal driving electrode disposed between the substrates; wherein the color filter is produced using a liquid crystal composition comprising a liquid crystal compound including at least one polymerizing group; a chiral agent; and a polymerization initiator, the liquid crystal composition being filtered using a filter having a pore size of not more than 1 μm, and a rate of pixel defects in the color filter is not more than $100/m^2$.

18. A liquid crystal display device comprising a color filter produced by a method comprising the steps of:
    forming an orientation film on a substrate;
    disposing, on the orientation film, a color filter forming layer comprising a liquid crystal composition; and
    irradiating ultraviolet light onto the color filter forming layer;
    wherein the liquid crystal composition includes at least one polymerizing group; a chiral agent; a polymerization initiator; an air-interface orientation agent; and a solvent, and the liquid crystal composition has a viscosity from 1 to 100 cP.

* * * * *